(12) United States Patent
Lee et al.

(10) Patent No.: US 12,554,601 B2
(45) Date of Patent: Feb. 17, 2026

(54) ELECTRONIC APPARATUS AND CONTROL METHOD THEREROF FOR HANDLING A CEC MALFUNCTION

(71) Applicant: SAMSUNG ELECTRONICS CO., LTD., Suwon-si (KR)

(72) Inventors: Sangeun Lee, Suwon-si (KR); Sumin Kim, Suwon-si (KR); Dongjun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 18/397,764

(22) Filed: Dec. 27, 2023

(65) Prior Publication Data

US 2024/0272995 A1 Aug. 15, 2024

Related U.S. Application Data

(63) Continuation of application No. PCT/KR2023/018785, filed on Nov. 21, 2023.

(30) Foreign Application Priority Data

Feb. 15, 2023 (KR) ........................ 10-2023-0019836

(51) Int. Cl.
*G06F 11/20* (2006.01)
*G06F 13/40* (2006.01)
(Continued)

(52) U.S. Cl.
CPC ...... *G06F 11/2002* (2013.01); *G06F 13/4022* (2013.01); *G06F 2201/85* (2013.01);
(Continued)

(58) Field of Classification Search
CPC ............. G06F 11/2002; G06F 13/4022; G06F 2201/85; H04N 21/431; H04N 21/43635; H04N 21/4622; H04N 21/485
See application file for complete search history.

(56) References Cited

U.S. PATENT DOCUMENTS 7,984,197 B2 * 7/2011 Lida ...................... G06F 3/1454
710/2
8,260,975 B1 * 9/2012 Schanin ................. G09G 5/006
710/36
(Continued)

FOREIGN PATENT DOCUMENTS

CN     103262526 A   * 8/2013    ........... G06F 3/1423
JP     2009-246461 A   10/2009
(Continued)

OTHER PUBLICATIONS

CN-103262526, translated on Mar. 20, 2025, pe2e search engine (Year: 2025).*

(Continued)

*Primary Examiner* — Michael Maskulinski
*Assistant Examiner* — Kayo Lisa Rusin
(74) *Attorney, Agent, or Firm* — Sughrue Mion, PLLC

(57) ABSTRACT

An electronic apparatus includes a display; an input interface including a first high-speed multimedia interface (HDMI) port configured to connect to a first source device, and a second HDMI port configured to connect to a second source device; and at least one processor operatively connected with the display and the input interface, wherein a first switching device is provided in a first consumer electronic control (CEC) line corresponding to the first HDMI port, and a second switching device is provided in a second CEC line corresponding to the second HDMI port, and wherein the at least one processor is configured to: control, based on a malfunction associated with a CEC function (Continued)

being identified from the first source device or the second source device, the display to display a user interface (UI) for turning off the CEC function, and turn off the CEC function by separately controlling at least one of the first switching device or the second switching device based on a user command received through the UI.

19 Claims, 23 Drawing Sheets

(51) Int. Cl.
    *H04N 21/431*     (2011.01)
    *H04N 21/4363*     (2011.01)
    *H04N 21/462*     (2011.01)
    *H04N 21/485*     (2011.01)

(52) U.S. Cl.
    CPC ..... *H04N 21/431* (2013.01); *H04N 21/43635* (2013.01); *H04N 21/4622* (2013.01); *H04N 21/485* (2013.01)

(56) References Cited

U.S. PATENT DOCUMENTS

| | | | |
|---|---|---|---|
| 8,395,705 | B2 | 3/2013 | Lee |
| 8,769,638 | B2 | 7/2014 | Seo |
| 8,860,893 | B2 | 10/2014 | Kawashima |
| 8,935,433 | B1 | 1/2015 | Hironaka |
| 9,942,605 | B2* | 4/2018 | Lee .................... H04N 21/4394 |
| 10,085,058 | B2 | 9/2018 | Lee et al. |
| 12,165,616 | B2 | 12/2024 | Yi et al. |
| 12,256,009 | B2* | 3/2025 | Gaddam .............. G06Q 20/206 |
| 2007/0036158 | A1 | 2/2007 | Hun-Kwon et al. |
| 2008/0127330 | A1 | 5/2008 | Seo |
| 2008/0170164 | A1 | 7/2008 | Park |
| 2009/0015723 | A1* | 1/2009 | Doumuki ............... H04N 5/775 348/725 |
| 2009/0244391 | A1 | 10/2009 | Kitami et al. |
| 2010/0050228 | A1 | 2/2010 | Kawashima |
| 2013/0250128 | A1* | 9/2013 | Wang .................... G09G 5/006 348/180 |
| 2017/0288895 | A1* | 10/2017 | Marino ............... G06F 13/4022 |
| 2019/0379887 | A1* | 12/2019 | Marino ............... H04L 12/2805 |
| 2020/0209942 | A1* | 7/2020 | Morita ............. H04N 21/44231 |
| 2020/0212898 | A1* | 7/2020 | Morita ..................... H03K 5/01 |
| 2020/0280757 | A1* | 9/2020 | Morita ..................... G06F 3/00 |
| 2023/0059126 | A1* | 2/2023 | Arling ................. H04L 65/1069 |

FOREIGN PATENT DOCUMENTS

| | | |
|---|---|---|
| KR | 10-0745282 B1 | 8/2007 |
| KR | 10-0765797 B1 | 10/2007 |
| KR | 10-2008-0066379 A | 7/2008 |
| KR | 10-0850917 B1 | 8/2008 |
| KR | 10-2009-0074860 A | 7/2009 |
| KR | 10-2010-0023784 A | 3/2010 |
| KR | 10-1306706 B1 | 9/2013 |
| KR | 10-2015-0043981 A | 4/2015 |
| KR | 10-1508703 B1 | 4/2015 |
| KR | 10-1586153 B1 | 1/2016 |
| KR | 10-2022-0005902 A | 1/2022 |

OTHER PUBLICATIONS

International Search Report (PCT/ISA/210) issued on Mar. 20, 2024 by the International Searching Authority in International Application No. PCT/KR2023/018785.
Written Opinion (PCT/ISA/237) issued on Mar. 20, 2024 by the International Searching Authority in International Application No. PCT/KR2023/018785.
Communication dated Jan. 7, 2026 issued by the European Patent Office in European Patent Application No. 23923051.9.
Hitachi, Ltd. et al., "High-Definition Multimedia Specification, Specification Version 1.2a", Dec. 14, 2005, XP030001518 (193 pages total).

* cited by examiner

ELECTRONIC APPARATUS AND CONTROL METHOD THEREROF FOR HANDLING A CEC MALFUNCTION

CROSS-REFERENCE TO RELATED APPLICATIONS

This application is a Bypass Continuation Applications of International Application No. PCT/KR2023/018785, filed on Nov. 21, 2023, which is based on and claims priority to Korean Patent Application No. 10-2023-0019836, filed on Feb. 15, 2023, in the Korean Intellectual Property Office, the disclosures of which are incorporated by reference herein in their entireties.

BACKGROUND

1. Field

The disclosure relates to an electronic apparatus and a control method thereof, and more particularly to an electronic apparatus that performs high-speed multimedia interface (HDMI) communication and a control method thereof.

2. Related Art

Electronic devices of various types are being developed and supplied with developments in electronic technology. Specifically, electronic apparatuses used in various locations such as homes, offices, and public places have been under continuous development recently for several years.

With the increase of content of an Ultra High Definition (HD) level resolution, surpassing a Full HD resolution, source devices and sink devices which include HDMI ports supporting HDMI 2.0 version or higher are being supplied more gradually.

A consumer electronic control (CEC) which is one from among the HDMI functions may be connected with one same line between the sink devices and the source devices, and various device compatibility issues are arising therefrom.

SUMMARY

Provided are an electronic apparatus, method, and non-transitory computer readable storage medium for turning off a CEC function corresponding to an HDMI port with an associated malfunction.

According to an aspect of the disclosure, an electronic apparatus includes: a display; an input interface including a first high-speed multimedia interface (HDMI) port configured to connect to a first source device, and a second HDMI port configured to connect to a second source device; and at least one processor operatively connected with the display and the input interface, wherein a first switching device is provided in a first consumer electronic control (CEC) line corresponding to the first HDMI port, and a second switching device is provided in a second CEC line corresponding to the second HDMI port, and wherein the at least one processor is configured to: control, based on a malfunction associated with a CEC function being identified from the first source device or the second source device, the display to display a user interface (UI) for turning off the CEC function, and turn off the CEC function by separately controlling at least one of the first switching device or the second switching device based on a user command received through the UI.

A malfunction HDMI port from among the first HDMI port and the second HDMI port may be identified with the malfunction associated with the CEC function, and the UI may include at least one of identification information of the malfunction HDMI port, information guiding to turn off of the CEC function of the malfunction HDMI port, or a menu for turning off the CEC function corresponding to the malfunction HDMI port.

Each of the first switching device and the second switching device may be configured to operate to be turned on or turned off according to whether power is applied, the at least one processor may include a general-purpose input/output (GPIO), a first pin of the GPIO is configured to be connected with the first switching device and a second pin of the GPIO is configured to be connected with the second switching device, and the at least one processor may be further configured to turn on or turn off at least one of the first switching device or the second switching device by controlling whether the power is to be applied to at least one of the first switching device or the second switching device using the GPIO.

Each of the first switching device and the second switching device may be configured to operate to be turned on or turned off according to whether power is applied, and the at least one processor may be further configured to: identify at least one malfunction HDMI port with the malfunction associated with the CEC function generated from among the first HDMI port and the second HDMI port by sequentially controlling the power applied to the first switching device and the second switching device according to the user command, and control the display to display the UI for turning off the CEC function corresponding to the at least one malfunction HDMI port.

The at least one processor may be further configured to: receive only a first CEC response signal corresponding to the first HDMI port by not applying the power to the first switching device according to the user command and maintaining a close state and applying the power to the second switching device and changing to an open state, identify whether the malfunction associated with the CEC function is generated from the first HDMI port based on the first CEC response signal, receive only a second CEC response signal corresponding to the second HDMI port by not applying the power to the second switching device and maintaining the close state and applying the power to the first switching device and changing to the open state, and identify whether the malfunction associated with the CEC function is generated from the second HDMI port based on the second CEC response signal.

The at least one processor may be further configured to: identify whether the malfunction associated with the CEC function is generated from the first HDMI port based on a first CEC address included in a first CEC response signal corresponding to the first HDMI port, whether the first CEC response signal is received, or whether the first CEC response signal is normal, and identify whether the malfunction associated with the CEC function is generated from the second HDMI port based on a second CEC address included in a second CEC response signal corresponding to the second HDMI port, whether the second CEC response signal is received, or whether the second CEC response signal is normal.

The at least one processor may be further configured to: identify, based on a same source device being recognized as connected to the first HDMI port and the second HDMI port based on CEC response signals received from the first HDMI port and the second HDMI port, whether the malfunction associated with the CEC function is generated by verifying CEC addresses of the first HDMI port and the second HDMI port, and control, based on the malfunction associated with the CEC function being identified from any one of the first HDMI port and the second HDMI port, the display to display the UI for turning off the CEC function corresponding to a malfunction HDMI port identified with the malfunction.

The at least one processor may be further configured to: transmit, based on a self-diagnosis function being executed, a command of a specific type through the first CEC line and the second CEC line, identify at least one malfunction HDMI port with the malfunction associated with the CEC function generated from among the first HDMI port and the second HDMI port based on a first CEC response signal received through the first HDMI port and a second CEC response signal received through the second HDMI port by sequentially controlling power applied to the first switching device and the second switching device, and control the display to turn off the CEC function of the at least one malfunction HDMI port or display the UI for turning off the CEC function of the at least one malfunction HDMI port.

The at least one processor may be further configured to: identify, based on a connected device diagnosis function being executed, whether a source device connected to one of the first HDMI port and the second HDMI port is a pre-defined malfunctioning device, and control, based on the source device connected to at least one malfunction HDMI port from among the first HDMI port and the second HDMI port being identified as the pre-defined malfunctioning device, the display to turn off the CEC function corresponding to the at least one malfunction HDMI port or display the UI for turning off the CEC function of the at least one malfunction HDMI port.

According to an aspect of the disclosure, a method of controlling an electronic apparatus including a first high-speed multimedia interface (HDMI) port configured to connect to a first source device and a second HDMI port configured to connect to a second source device, in which a first switching device is provided in a first consumer electronic control (CEC) line corresponding to the first HDMI port, and a second switching device is provided in a second CEC line corresponding to the second HDMI port, the method including: displaying, based on a malfunction associated with a CEC function being identified from at least one of the first source device or the second source device, a user interface (UI) for turning off the CEC function; and turning off the CEC function by separately controlling at least one of the first switching device or the second switching device based on a user command received through the UI.

The method may further include: identifying a malfunction HDMI port from among the first HDMI port and the second HDMI port with the malfunction associated with the CEC function, and the UI may include at least one of identification information of the malfunction HDMI port, information guiding to turn off of the CEC function of the malfunction HDMI port, or a menu for turning off the CEC function corresponding to the malfunction HDMI port.

Each of the first switching device and the second switching device is configured to operate to be turned on or turned off according to whether power is applied, the electronic apparatus may include at least one processor configured to control the electronic apparatus, the at least one processor may include a general-purpose input/output (GPIO), a first pin of the GPIO is configured to be connected with the first switching device and a second pin of the GPIO is configured to be connected with the second switching device, and the turning off the CEC function may include turning on or turning off at least one of the first switching device or the second switching device by controlling whether the power is to be applied to at least one of the first switching device or the second switching device using the GPIO.

Each of the first switching device and the second switching device may be configured to operate to be turned on or turned off according to whether power is applied, and the displaying the UI may include: identifying at least one malfunction HDMI port with the malfunction associated with the CEC function generated from among the first HDMI port and the second HDMI port by sequentially controlling the power applied to the first switching device and the second switching device according to the user command; and displaying the UI for turning off the CEC function corresponding to the at least one malfunction HDMI port.

The displaying the UI may further include: receiving only a first CEC response signal corresponding to the first HDMI port by not applying the power to the first switching device according to the user command and maintaining a close state and applying the power to the second switching device and changing to an open state; identifying whether the malfunction associated with the CEC function is generated from the first HDMI port based on the first CEC response signal; receiving only a second CEC response signal corresponding to the second HDMI port by not applying the power to the second switching device and maintaining the close state and applying the power to remaining switching devices including the first switching device and changing to the open state; and identifying whether the malfunction associated with the CEC function is generated from the second HDMI port based on the second CEC response signal.

According to an aspect of the disclosure, a non-transitory computer readable storage medium stores computer instructions that are executed by at least one processor of an electronic apparatus to perform a method, the electronic apparatus including a first high-speed multimedia interface (HDMI) port configured to connect to a first source device and a second HDMI port configured to connect to a second source device, a first switching device provided in a first consumer electronic control (CEC) line corresponding to the first HDMI port, and a second switching device provided in a second CEC line corresponding to the second HDMI port, the method including: displaying, based on a malfunction associated with a CEC function being identified from at least one of the first source device and the second source device, a user interface (UI) for turning off the CEC function; and turning off the CEC function by separately controlling at least one of the first switching device or the second switching device based on a user command received through the UI.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Example embodiments of the disclosure are described below with reference to the drawings.

Terms used in the disclosure will be briefly described, and the disclosure will be described in detail.

The terms used in describing one or more embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," "comprises," "comprising," or the like are used to designate a presence of a corresponding characteristic (e.g., elements such as numerical value, function, operation, or component), and not to preclude a presence or a possibility of additional characteristics.

The expression "at least one of A or B" is to be understood as indicating any one of "A" or "B" or "A and B."

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in one or more embodiments herein perform at least one function or operation, and may be implemented with a hardware or software, or implemented with a combination of hardware and software. Further, a plurality of "modules" or a plurality of "parts," except for a "module" or a "part" which needs to be implemented to a specific hardware, may be integrated to at least one module and implemented in at least one processor.

Figure 1:
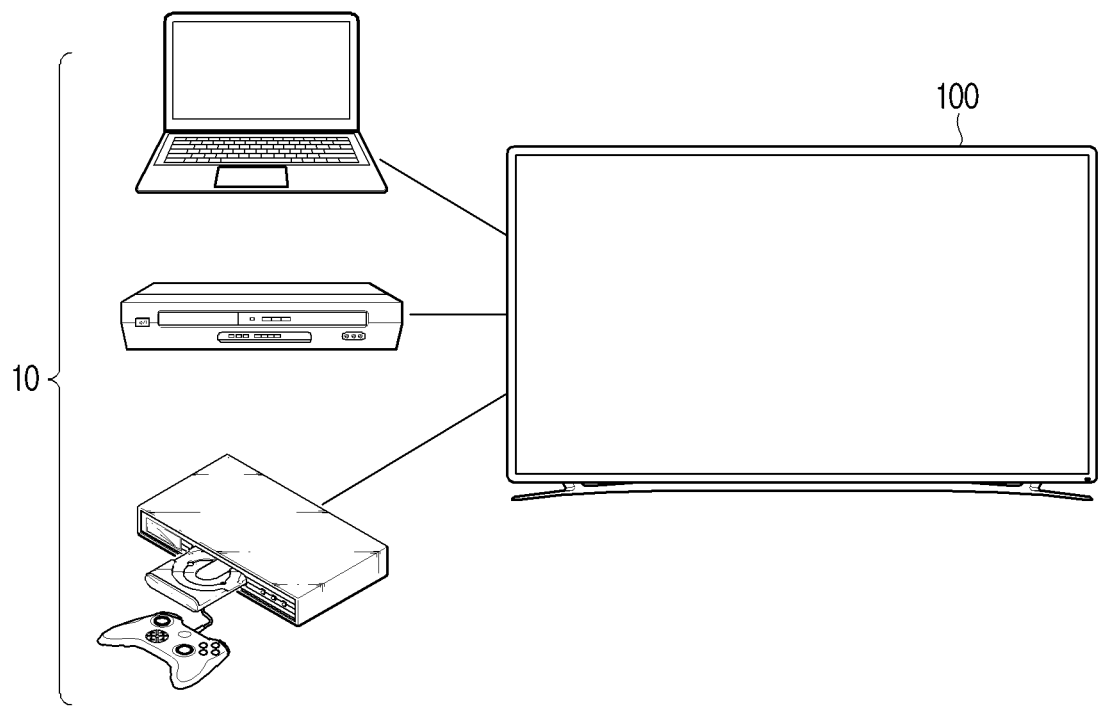
FIG. 1 is a perspective view of an electronic system according to one or more embodiments of the disclosure.

FIG. 1 is a perspective view of an electronic system according to one or more embodiments of the disclosure.

Referring to FIG. 1, an electronic system may include a source device 10 and an electronic apparatus 100.

The source device 10 may provide content to the electronic apparatus 100 (i.e., a sink device). Here, the source device 10 may be implemented as an electronic apparatus of various types capable of providing content to the electronic apparatus 100 such as, for example, and without limitation, a set top box, an over the top (OTT) device, a DVD player, a Blu-ray disc player, a personal computer (PC), a game console, a sound bar, and the like.

The electronic apparatus 100 may be implemented as an electronic apparatus (or a content output device) of various types capable of outputting content received from the source device 10 such as, for example, and without limitation, a network television (TV), a smart TV, an internet TV, a web TV, an internet protocol television (IPTV), a signage, a PC, a smart phone, a tablet PC, a notebook PC, a large format display (LFD), a digital signage, a digital information display (DID), a video wall, a projector display, and the like.

Specifically, the electronic apparatus 100 may be implemented as a device that supports a high-speed multimedia interface (HDMI). Accordingly, the electronic apparatus 100 and the source device 10 may include an HDMI port, and perform communication with each other through the corresponding HDMI port. According to an example, a plurality of source devices 10 (e.g. the first source device and the second source device) may perform communication with the electronic apparatus 100 through different respective HDMI ports.

The source device 10 may provide, based on extended display identification date (EDID) information received from the electronic apparatus 100, a corresponding content to the electronic apparatus 100. Here, the EDID may be a standard for transferring display information from the electronic apparatus 100, that is, a display side to the source device 10, that is, a host side. A meaning of the EDID may not be to define an interface signal such as a display data channel (DDC), but to define a data format for display capabilities to be read in a host. In the EDID, information about a screen ratio information, a name of a manufacturer, a production year and month of a product, a type of the product, an EDID version, a resolution and color coordinates of the product, a type of phosphor or filter, timing, a screen size, brightness, resolution, and the like may be included. Specifically, in an HDMI standard, resolution information and color information of the electronic apparatus 100 may be stored through a vender specific data block (VSDB), and implemented such that the source device 10 is configured to read the VSDB information and transmit content corresponding thereto to the electronic apparatus 100.

Figure 2A:
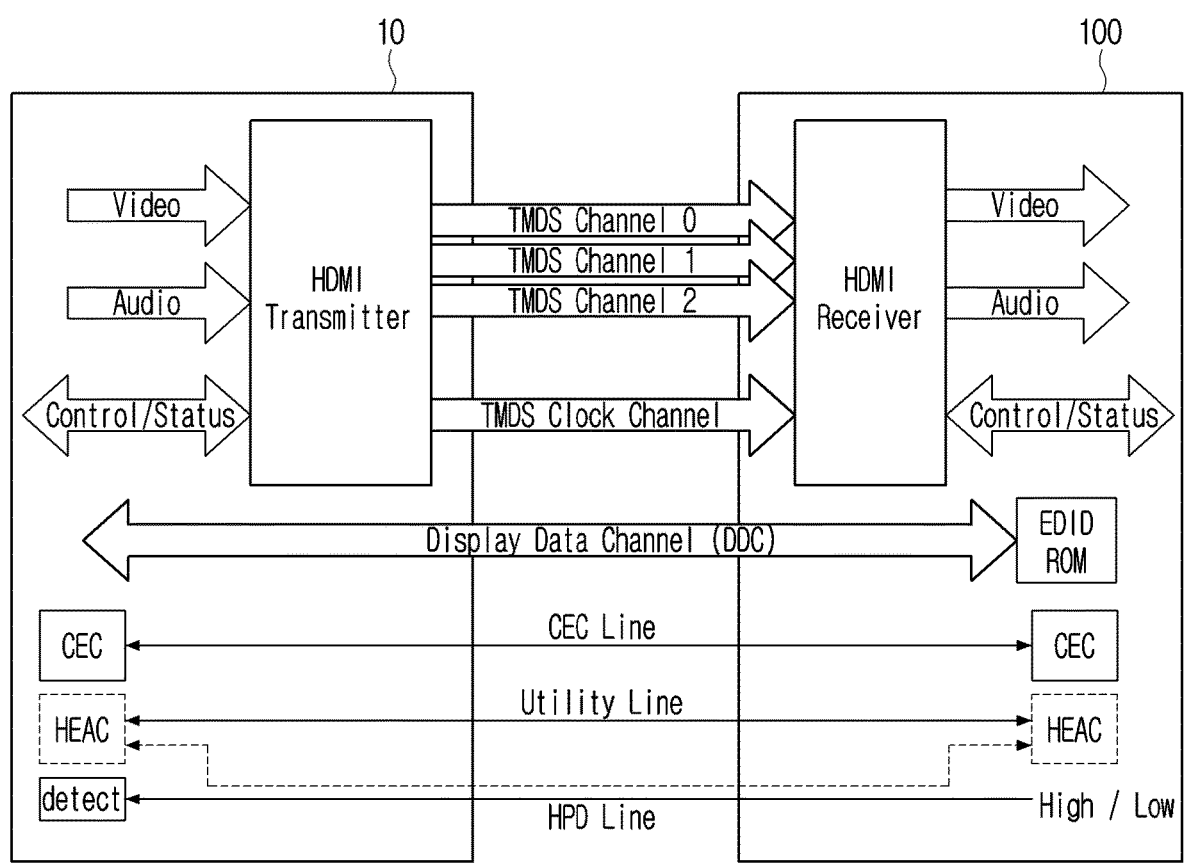
FIG. 2A is a diagram illustrating an HDMI cable configuration to assist in the understanding of the disclosure.
Figure 2B:
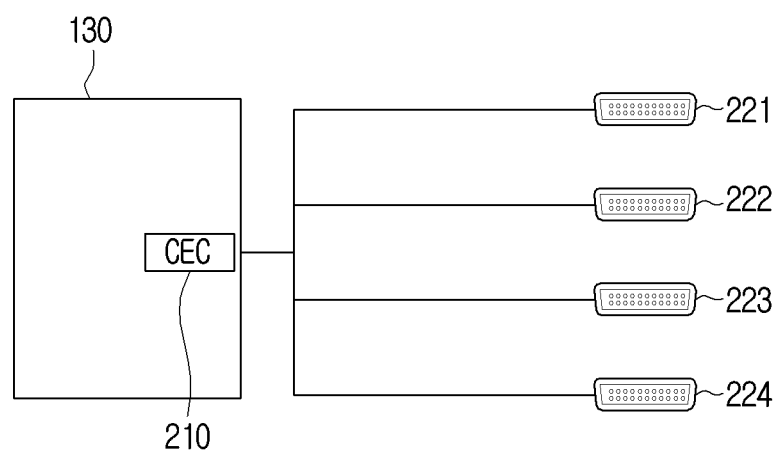
FIG. 2B is a diagram illustrating an HDMI cable configuration to assist in the understanding of the disclosure.

FIG. 2A and FIG. 2B are diagrams illustrating an HDMI cable configuration to assist in the understanding of the disclosure.

As shown in FIG. 2A, the HDMI cable may include a transition minimized differential signaling (TMDS) line, a display data channel (DDC) line, a consumer electronic control (CEC) line, a utility line, and a hot plug detect (HPD) line. The transition minimized differential signaling (TMDS) channel for receiving input of video and audio signals, the display data channel (DDC) for receiving input of device information, and information associated with a video or audio (e.g., EDID) from a connected source device 10, a consumer electronic control (CEC) line and a hot plug detect (HPD) line capable of transferring a control signal to the source device, and the like may be included.

Referring to FIG. 2B, the CEC line (or a CEC path) may be connected with one same line between the source device 10 and the electronic apparatus 100, that is, a plurality of HDMI ports 221, 222, 223, and 224, and device compatibility issues may be frequency generated due to communication being performed based on a physical address. For example, compatibility issues may be generated due to various malfunctions such as, for example, and without limitation, a same physical address being allocated to a different source device, a signal of a different source device also being affected according to a specific source device transmitting a low signal, and the like. In this case, the problem described should be resolved in a method of turning off a CEC function of a source device in which a malfunction is generated or turning off a CEC function of the electronic apparatus 100. However, in order to turn off the CEC function of the source device, user inconvenience may be caused because an operation or setting of a dedicated remote controller of the source device is needed. In addition, if the CEC function of the electronic apparatus 100 is turned off, there may be a problem of not being able to use not only the source device in which the malfunction is generated, but also a CEC function of another source device.

Accordingly, various embodiments in which a problem due to a malfunction of the CEC function of the source device being effectively solved by separately controlling the CEC line corresponding to respective HDMI ports will be described below.

Figure 3A:
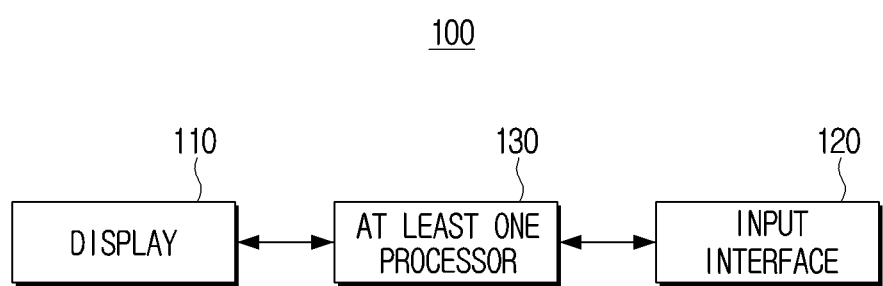
FIG. 3A is a block diagram illustrating a configuration of an electronic apparatus according to one or more embodiments.

FIG. 3A is a block diagram illustrating a configuration of an electronic apparatus according to one or more embodiments.

Referring to FIG. 3A, the electronic apparatus 100 may include a display 110, an input interface 120, and at least one processor 130.

The display 110 may be implemented as a display including self-emissive devices, or a display including non-emissive devices and a backlight. For example, the display 110 may be implemented as a display of various types such as, for example, and without limitation, a liquid crystal display (LCD), an organic light emitting diode (OLED) display, a light emitting diode (LED), a micro LED, a mini LED, a plasma display panel (PDP), a quantum dot (QD) display, a quantum dot light emitting diodes (QLED), or the like. In the display 110, a driving circuit, which may be implemented in the form of an a-si TFT, a low temperature poly silicon (LTPS) TFT, an organic TFT (OTFT), or the like, a backlight unit, and the like may be included. The display 110 according to an example may be implemented as a flat display, a curved display, a folding and/or a rollable flexible display, or the like.

The input interface 120 may perform communication with an external device. For example, the external device may be implemented as the source device 10 of various types shown in FIG. 1. For convenience of description below, an example of the external device implemented as the source device 10 shown in FIG. 1 may be assumed and described.

The input interface 120 may be implemented as an HDMI port capable of receiving transmission of a high-resolution video and/or a multi-channel digital audio from the source device 10 with one cable. Specifically, the input interface 120 may be implemented as an HDMI port supporting an HDMI standard.

The input interface 120 according to one or more embodiments may include a plurality of HDMI ports. For example, the respective HDMI ports may be connected with different source devices. Here, the different source devices may be devices of different types, but is not limited thereto, and may be devices of a same type. For example, the source device 10 of various types shown in FIG. 1 may be connected through the respective HDMI ports.

In addition thereto, the input interface 120 may further include a communication port according to communication methods such as, for example, and without limitation, a mobile high-definition link (MHL), Audio Engineering Society/European Broadcasting Union (AES/EBU), Optical, Coaxial, or the like.

The at least one processor 130 may control the overall operation of the electronic apparatus 100. Specifically, the at least one processor 130 may control the overall operation of the electronic apparatus 100 by being connected with each configuration of the electronic apparatus 100. For example, the at least one processor 130 may control the overall operation of the electronic apparatus 100 by being electrically connected with the display 110 and the input interface 120. The at least one processor 130 may be formed of one or a plurality of processors.

Figure 3B:
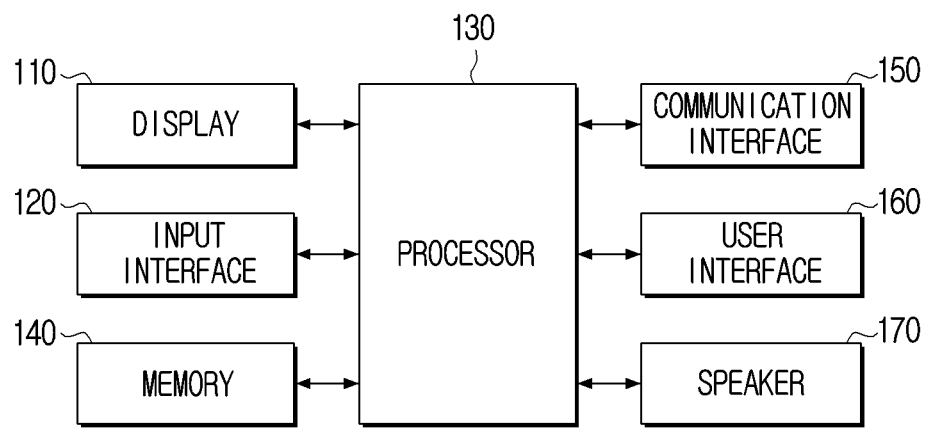
FIG. 3B is a block diagram illustrating a detailed configuration of an electronic apparatus according to one or more embodiments.

The at least one processor 130 may perform an operation of the electronic apparatus 100 according to various embodiments by executing at least one instruction stored in a memory 140 (FIG. 3B).

The at least one processor 130 may include at least one from among a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The at least one processor 130 may control one or a random combination from among other elements of the electronic apparatus 100, and perform an operation associated with communication or data processing. The at least one processor 130 may execute at least one program or instruction stored in a memory. For example, the at least one processor may perform, by executing at least one instruction stored in the memory, a method according to one or more embodiments of the disclosure.

When a method according to one or more embodiments of the disclosure includes a plurality of operations, the plurality of operations may be performed by one processor, or performed by a plurality of processors. For example, when a first operation, a second operation, and a third operation are performed by a method according to one or more embodiments, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The at least one processor 130 may be implemented as a single core processor that includes one core, or as at least one multicore processor that includes a plurality of cores (e.g., a homogeneous multicore or a heterogeneous multicore). If the at least one processor 130 is implemented as a multicore processor, the respective cores included in the multicore processor may include a memory inside the processor such as a cache memory and an on-chip memory, and a common cache shared by the plurality of cores may be included in the multicore processor. In addition, the respective cores (or a portion from among the plurality of cores) included in the multicore processor may independently read and perform a program command for implementing a method according to one or more embodiments, or read and perform a program command for implementing a method according to one or more embodiments of the disclosure due to a whole (or a portion) of the plurality of cores being interconnected.

When a method according to one or more embodiments of the disclosure include a plurality of operations, the plurality of operations may be performed by one core from among the plurality of cores or performed by the plurality of cores included in the multicore processor. For example, when a first operation, a second operation, and a third operation are performed by a method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

According to one or more embodiments of the disclosure, the processor may refer to a system on chip (SoC), a single core processor, or a multicore processor in which the at least one processor and other electronic components are integrated or a core included in the single core processor or the multicore processor, and the core herein may be implemented as the CPU, the GPU, the APU, the MIC, the DSP, the NPU, the hardware accelerator, the machine learning accelerator, or the like, but is not limited to the one or more embodiments of the disclosure. However, for convenience of description, the at least one processor 130 will be described below as the 'processor 130.'

FIG. 3B is a block diagram illustrating a detailed configuration of an electronic apparatus according to one or more embodiments.

Referring to FIG. 3B, an electronic apparatus 100' may include the display 110, the input interface 120, the at least one processor 130, a memory 140, a communication interface 150, a user interface 160, and a speaker 170. Detailed descriptions of configurations overlapping with the configurations shown in FIG. 3A from among the configurations shown in FIG. 3B will be omitted.

The memory 140 may store data necessary in the various embodiments. The memory 140 may be implemented in the form of a memory embedded in the electronic apparatus 100' according to a data storage use, or in the form of a memory attachable to or detachable from the electronic apparatus 100'. For example, the data for the driving of the electronic apparatus 100' may be stored in a memory embedded to the electronic apparatus 100', and data for an expansion function of the electronic apparatus 100' may be stored in a memory attachable to or detachable from the electronic apparatus 100'. Meanwhile, the memory embedded in the electronic apparatus 100' may be implemented as at least one from among a volatile memory (e.g., a dynamic random access memory (DRAM), a static RAM (SRAM), or a synchronous dynamic RAM (SDRAM)), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). In addition, the memory attachable to or detachable from the electronic apparatus 100' may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., universal serial bus (USB) memory) connectable to a USB port, or the like.

The communication interface 150 may support various communication methods according to an embodiment of the electronic apparatus 100'. For example, the communication interface 150 may perform communication with an external device, an external server (e.g., a cloud server), and the like through communication methods such as, for example, and without limitation, Bluetooth, AP-based Wi-Fi (Wireless LAN network), ZigBee, a wired/wireless local area network (LAN), a wide area network (WAN), Ethernet, IEEE 1394, or the like.

The user interface 160 may be implemented with a device such as a button, a touch pad, a mouse and a keyboard, or implemented as a touch screen capable of performing the above-described display function and the operation input function together therewith. The user interface 160 according to one or more embodiments may receive a remote controller signal implemented as a remote controller transceiver. The remote controller transceiver may receive the remote controller signal from an external remote control device through at least one communication method from among an infrared communication, a Bluetooth communication, or a Wi-Fi communication, or transmit the remote controller signal.

The speaker 170 may output a sound signal. For example, the speaker 170 may convert and amplify a digital sound signal processed from the processor 130 to an analog sound signal and output the signal. For example, the speaker 170 may include at least one speaker unit capable of outputting at least one channel, a D/A converter, an audio amplifier, and the like. The speaker 170 according to an example may be implemented to output various multi-channel sound signals.

In addition to the above, the electronic apparatus 100' may include a camera, a microphone, a sensor, a tuner, a demodulator, and the like according to an embodiment.

The camera may be turned on according to a pre-set event and perform capturing. The camera according to an example may recognize a user motion command based on a captured image.

The microphone may be a configuration for receiving input of a user voice or other sounds and converting to audio data. However, the electronic apparatus 100' according to other embodiments may receive the user voice input through an external device through the communication interface 150.

The sensor may include sensors of various types such as, for example, and without limitation, a touch sensor, a proximity sensor, an acceleration sensor, a geomagnetic sensor, a gyro sensor, a pressure sensor, a position sensor, an illuminance sensor, or the like.

The tuner may receive a radio frequency (RF) broadcast signal by tuning a channel selected by a user or all pre-stored channels from among the RF broadcast signals received through an antenna.

The demodulator may receive and demodulate a digital intermediate frequency (DIF) signal converted from the tuner and perform a channel decoding, or the like.

Figure 4:
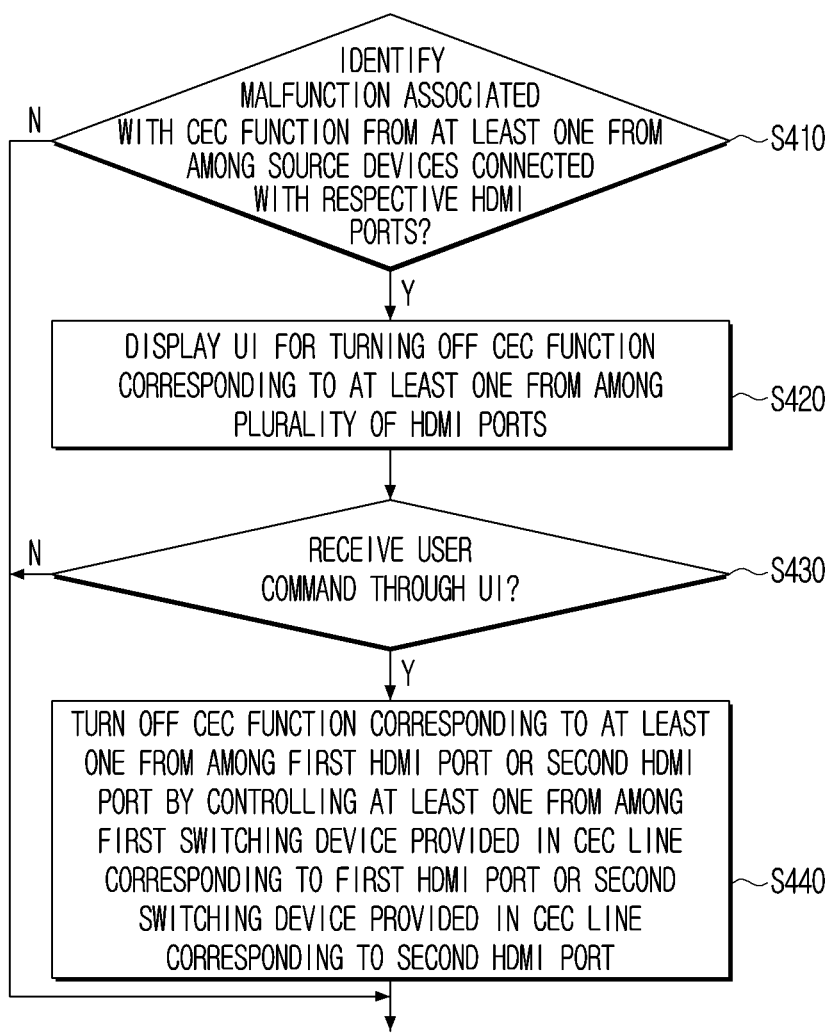
FIG. 4 is a flowchart illustrating a control method of an electronic apparatus according to one or more embodiments.

FIG. 4 is a flowchart illustrating a control method of an electronic apparatus according to one or more embodiments.

According to one or more embodiments shown in FIG. 4, the processor 130 may identify a malfunction associated with the CEC function from at least one from among the source devices connected with the respective HDMI ports (S410).

The processor 130 may control, based on the malfunction associated with the CEC function being identified from at least one from among the source devices connected with the respective HDMI ports (S410:Y), the display 110 to display a user interface (UI) for turning off the CEC function corresponding to the identified at least one (S420). Here, the malfunction associated with the CEC function may include a malfunction of a different source device performing CEC response due to a same physical address being allocated to the different source device, a malfunction of the electronic apparatus 100 not recognizing a CEC signal of a different source device according to a specific source device transmitting a low signal, and various malfunctions associated with the CEC function such as the malfunction of the source device not performing the CEC response.

The UI according to an example may include at least one from among identification information of an HDMI port identified with the malfunction associated with the CEC function, information guiding the turning off of the CEC function, or a menu for turning off the CEC function corresponding to at least one from among the plurality of HDMI ports. For example, the UI may include a menu for controlling turning on or turning off of the CEC functions of the respective HDMI ports. Alternatively, the UI may include a menu for controlling the turning on or turning off of the CEC function of the respective HDMI ports identified with the malfunction.

Then, the processor 130 may control, based on a user command being received through the UI (S430:Y), at least one from among a first switching device or a second switching device based on the received user command and turn off the CEC function corresponding to at least one from among a first HDMI port or a second HDMI port (S440).

For example, the user command may be a user command with which a menu that turns off the CEC function corresponding to at least one from among the first HDMI port or the second HDMI port is selected.

Here, the first switching device may be provided at the CEC line corresponding to the first HDMI port from among the plurality of HDMI ports, and the second switching device may be provided at the CEC line corresponding to the second HDMI port from among the plurality of HDMI ports. However, only the first switching device and the second switching device have been described for convenience of description, and a separate switching device may be provided at the CEC line corresponding to the respective HDMI ports if the plurality of HDMI ports are at least three. However, the switching device may not be provided at the CEC line corresponding to a portion of the HDMI ports from among the plurality of HDMI ports according to another example. For example, in general, a set top box may be connected to an HDMI 1 port and an audio return channel (ARC) device may be connected to an HDMI 2 port and an HDMI 3 port, and if a CEC function malfunction is not generated from a device which is connected to the HDMI 1 port, a switching device may not be provided at the HDMI 1 port. However, the above is merely one embodiment, and switching devices may be provided at all HDMI ports included in the input interface 120.

The switching device according to an example may be implemented as a relay switch, but so long as it is a control device capable of controlling a conduction or disconnection of current, the above is applicable without being limited thereto. For example, the relay switch may convert flowing electricity to a switchable signal or a pulse and may be automatically turned on or turned off.

Figure 5A:
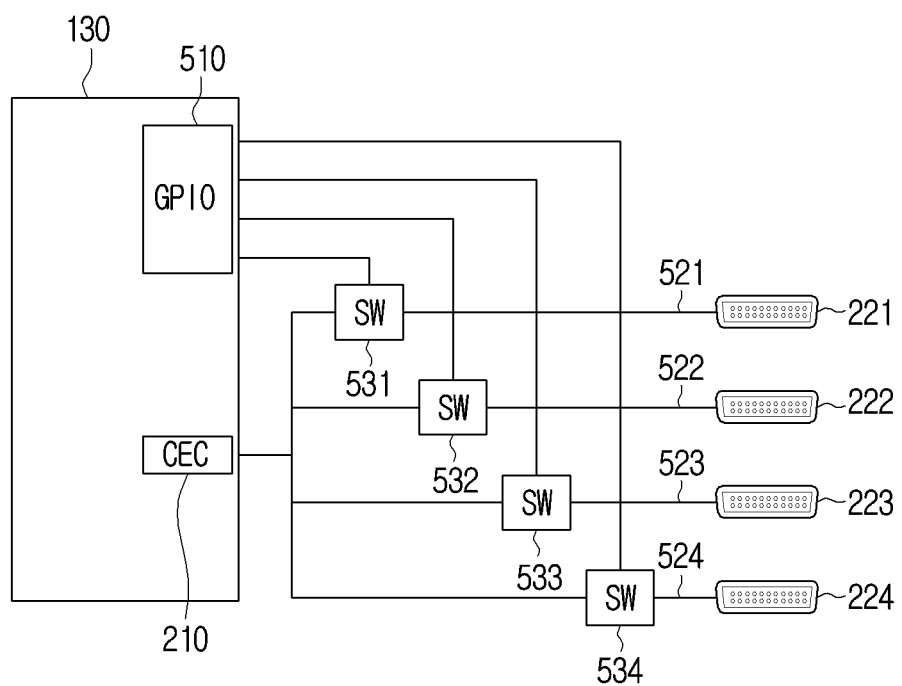
FIG. 5A is a diagram illustrating a CEC line structure according to one or more embodiments.
Figure 5B:
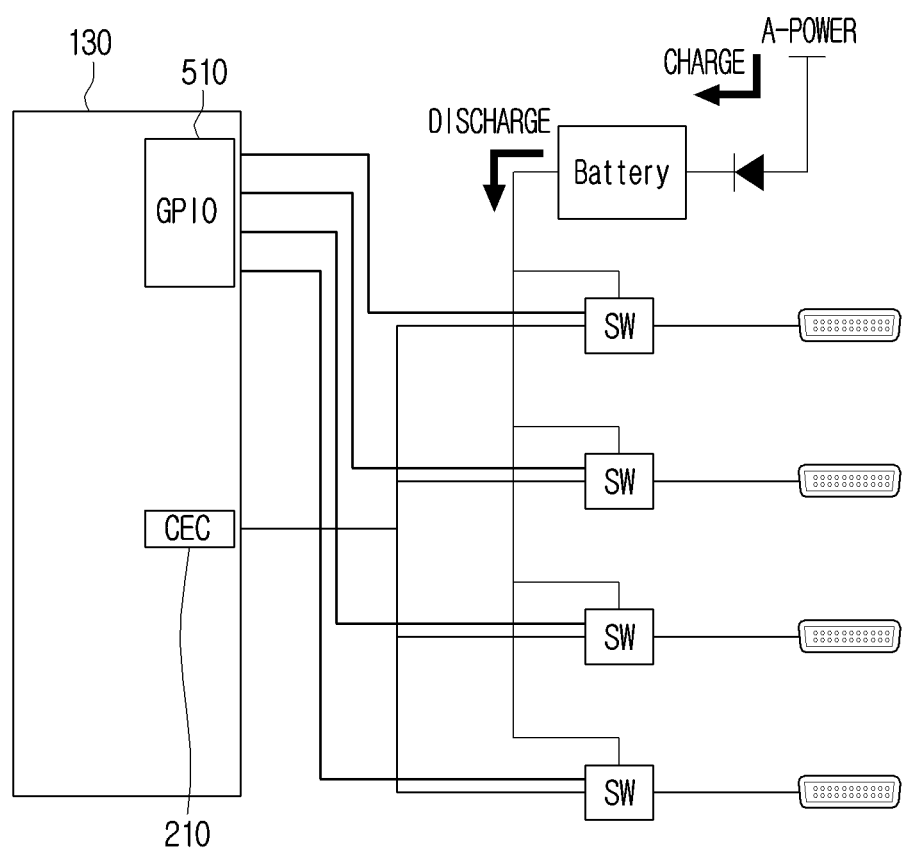
FIG. 5B is a diagram illustrating a CEC line structure according to one or more embodiments.

FIG. 5A and FIG. 5B are diagrams illustrating a CEC line structure according to one or more embodiments.

Referring to FIG. 5A, a CEC line connected from a CEC module 210 to the input interface 120, that is, a plurality of HDMI ports 221, 222, 223, and 224 provided in the processor 130 may be implemented in a form which starts with one line and branches into the respective HDMI ports 221, 222, 223, and 224. In addition, switching devices 531, 532, 533, and 534 may be provided in CEC lines 521, 522, 523, and 524 corresponding to the respective HDMI ports 221, 222, 223, and 224.

The processor 130 according to an example may include a general-purpose input/output (GPIO), and may separately control the switching devices 531, 532, 533, and 534 provided in the CEC lines 521, 522, 523, and 524 through the GPIO. Here, the GPIO may refer to a digital signal pin of an integrated circuit or an electric circuit, an operation of which including an input or output being controllable at run time. The GPIO according to an example may include a plurality of pins, and the respective pins may be connected with the switching devices 531, 532, 533, and 534. For example, the respective pins included in the GPIO and the switching device may be connected in a pattern form. According to an example, one from among the plurality of pins included in the GPIO may be connected with the first switching device and another one from among the plurality of pins may be connected with the second switching device.

The switching device according to an example may be operated to be turned on or turned off according to whether power is applied. Accordingly, the processor 130 may turn on or turn off at least one from among the first switching device or the second switching device by controlling whether to apply power to at least one from among the first switching device or the second switching device using the GPIO.

For example, when power is not applied to the switching device, a close state (or an on state) may be maintained for a line provided with the switching device to be conducted (electrically connected), and when power is applied to the switching device, the switching device may be changed to an open state (or an off state) and the line provided with the switching device may be disconnected (electrical connection disconnected). Accordingly, when the switching device is turned on, the CEC function may be activated because signal transmission of the corresponding CEC line is possible, and when the switching device is turned off, the CEC function may be deactivated because signal transmission of the corresponding CEC line is not possible.

However, embodiments of the switching device may be various and so long as it is in a form capable of controlling a conduction state or a disconnection state, the above is not limited thereto. For example, it may be possible for the switching device to be implemented such that when power is applied, the switching device maintains the close state (or the on state) for the line provided with the switching device to be conducted (electrically connected), and changed to the open state (or the off state) when power is not applied to the switching device for the line provided with the switching device to be disconnected (electrical connection disconnected).

Meanwhile, according to a CTS evaluation item for an HDMI standard authentication, DDC/CEC Line Capacitance, CEC Line Connectivity, CEC Line Degradation, and the like is to be satisfied. Specifically, an item for the CEC lines to be connected in a printed board assembly (PBA) state is included. Based on the above, the switch is to be turned on even in the PBA state by inserting the battery as shown in FIG. 5B, and the on and off of the switch may be implemented to be controllable using the GPIO 510 when operating the electronic apparatus 100.

Figure 6A:
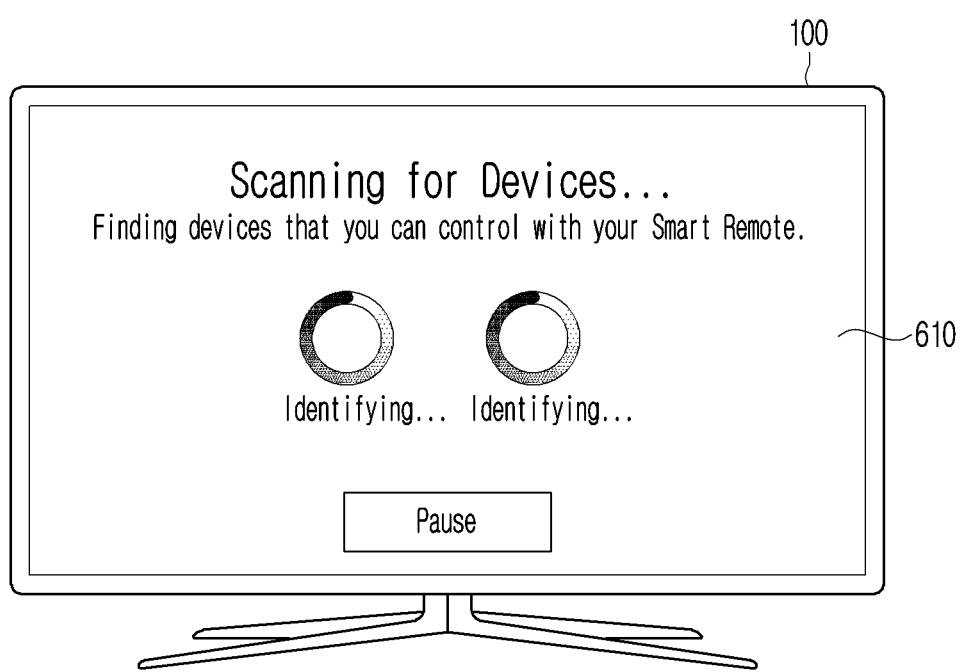
FIG. 6A is a diagram illustrating an example of a method of identifying a CEC malfunction according to one or more embodiments.
Figure 6B:
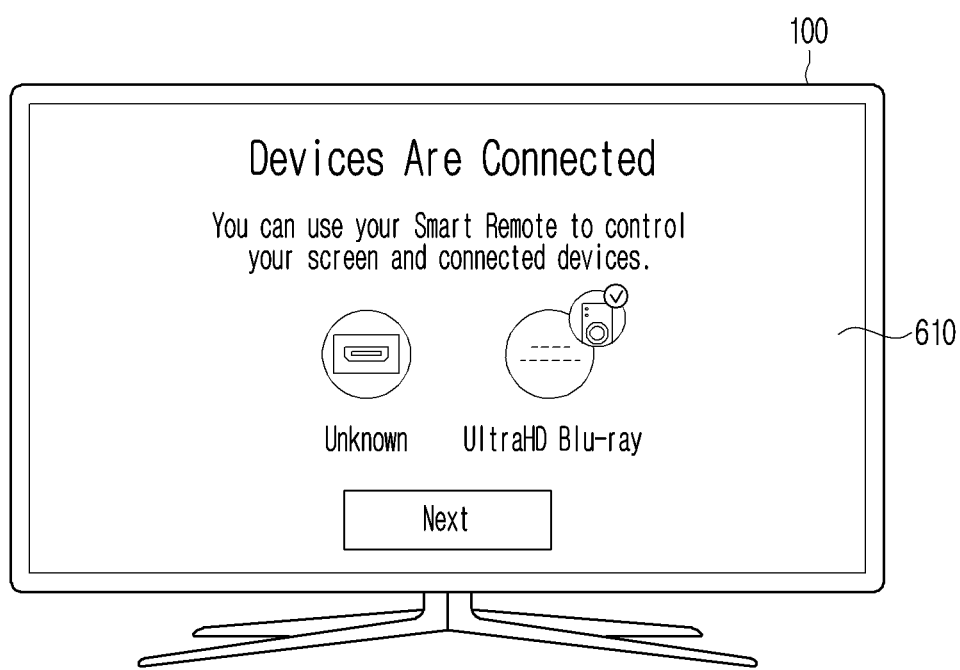
FIG. 6B is a diagram illustrating an example of a method of identifying a CEC malfunction according to one or more embodiments.
Figure 6C:
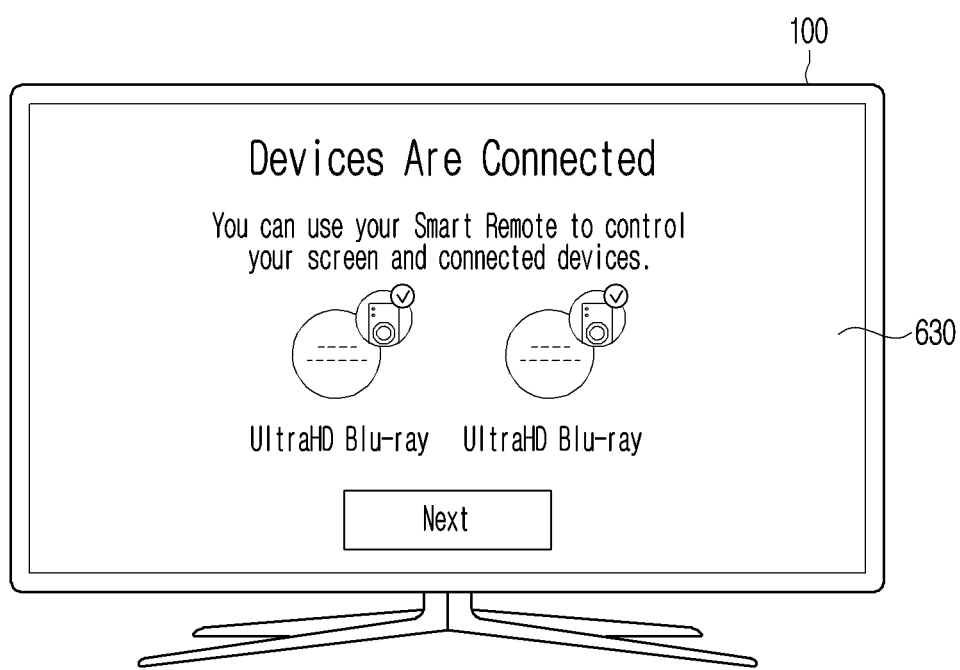
FIG. 6C is a diagram illustrating an example of a method of identifying a CEC malfunction according to one or more embodiments.

FIG. 6A to FIG. 6C are diagrams illustrating an example of a method of identifying a CEC malfunction according to one or more embodiments.

When a connected device scanning function is executed according to one or more embodiments, a device scanning UI screen 610 as shown in FIG. 6A may be provided.

According to an example, when the connected device is not recognized in the HDMI 1 port and a specific connected device, for example, an Ultra HD Blu-ray device is recognized in the HDMI 2 port a UI screen 620 as shown in FIG. 6B may be provided. For example, the UI screen 620 as shown in FIG. 6B may be a provided UI screen when a connected device scanning is normally completed, that is, when no malfunction associated with the CEC function is generated in the at least one connected device.

According to another example, if a same device, for example, an Ultra HD Blu-ray device is recognized in the HDMI 1 port and the HDMI 2 port, a UI screen 630 as shown in FIG. 6C may be provided. In this case, unless the same device is connected to the HDMI 1 port and the HDMI 2 port, the user may be able to predict that a malfunction associated with the CEC function is generated in at least one from among the HDMI 1 port and the HDMI 2 port through the UI screen 630. In this case, a UI screen for receiving input of a user command for checking whether there is a malfunction of the CEC function for the HDMI 1 port and the HDMI 2 port may be provided, and a function for identifying the HDMI port to which the malfunction is generated may be executed according to the user command. For example, a UI including a message inquiring as to whether the same device is connected in the HDMI 1 port and the HDMI 2 port, a message inquiring as to whether to execute a diagnosis function of a function to check whether there is a malfunction of the CEC function, and menu buttons for selecting whether to execute may be provided.

Figure 7:
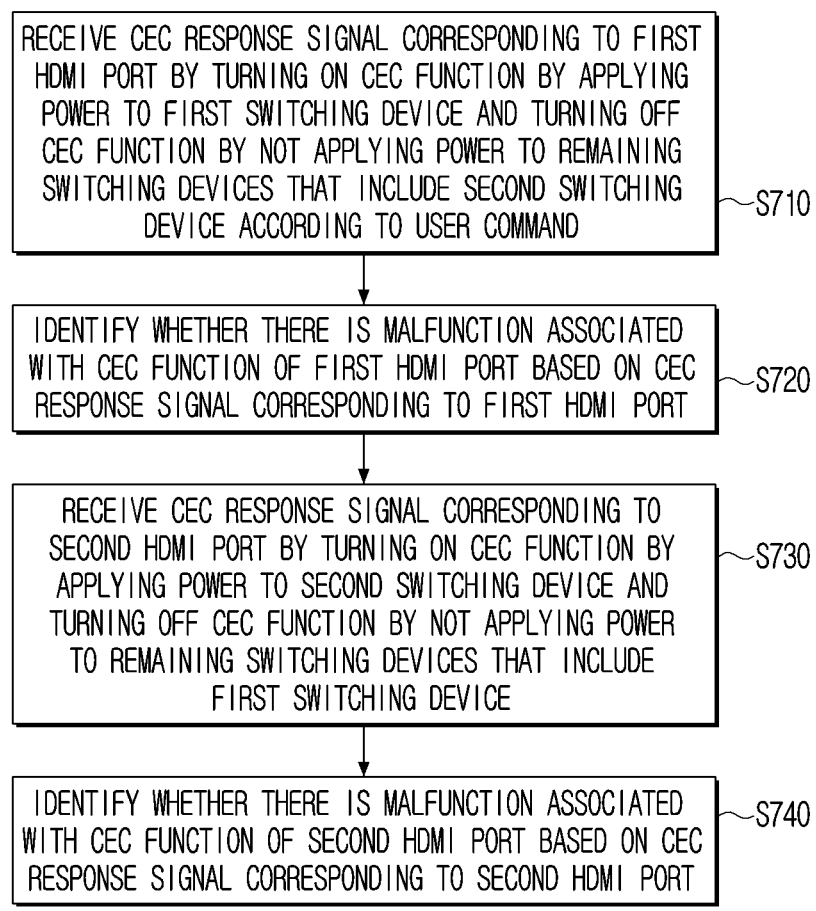
FIG. 7 is a diagram illustrating a control method of an electronic apparatus according to one or more embodiments.
Figure 8:
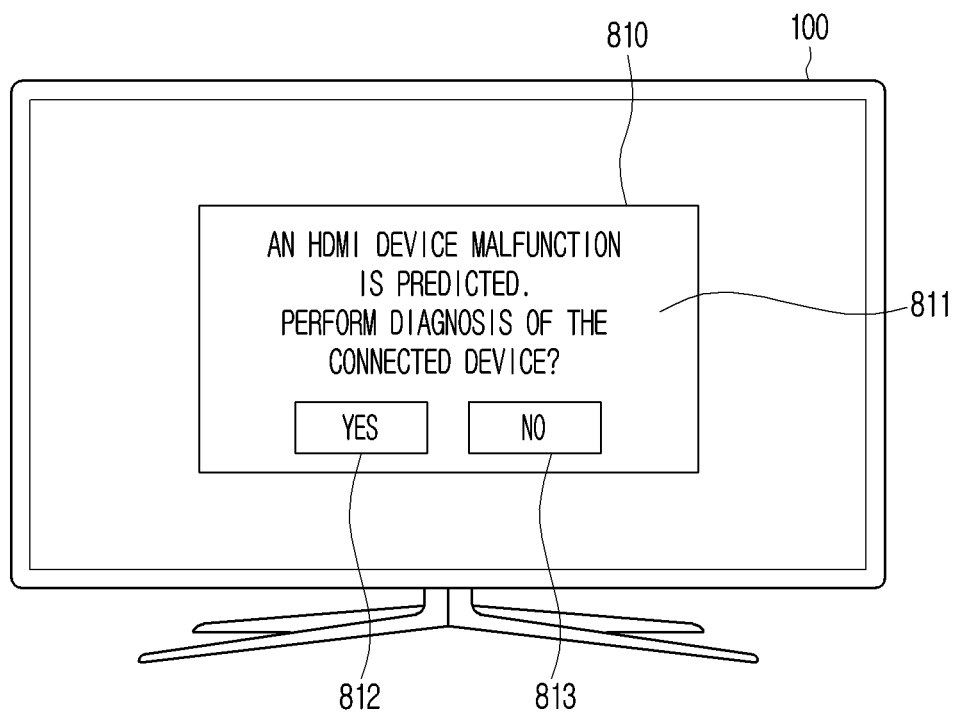
FIG. 8 is a diagram illustrating a control method of an electronic apparatus according to one or more embodiments.

FIG. 7 and FIG. 8 are diagrams illustrating a control method of an electronic apparatus according to one or more embodiments.

According to one or more embodiments, the processor 130 may identify at least one HDMI port with a malfunction associated with the CEC function generated from among the plurality of HDMI ports by sequentially controlling power applied to the switching device provided in the respective HDMI ports according to the user command. Then, the processor 130 may control the display 110 to display the UI for turning off the CEC function corresponding to the identified at least one HDMI port.

According to an example, as shown in FIG. 6C, if a malfunction associated with the CEC function is predicted to have generated in at least one from among the first HDMI port and the second HDMI port, the function for identifying the HDMI port to which the malfunction is generated may be executed according to a user command. For example, the user may input, based on a UI being provided as shown in FIG. 6C, the user command for identifying the malfunction.

According to an example, a UI 810 for receiving input of a user command for identifying a malfunction as shown in FIG. 8 may be provided. For example, the provided UI 810 may include a UI message 811 such as "An HDMI device malfunction is predicted. Perform diagnosis of the connected device?" and menu buttons 812 and 813 for selecting or unselecting a connected device diagnosis operation.

Referring to FIG. 7, the processor 130 may receive only a CEC response signal corresponding to the first HDMI port by maintaining the on state by not applying power to only the first switching device, and turning off by applying power to the remaining switching devices that include the second switching device according to the user command (S710).

Then, the processor 130 may identify whether there is a malfunction associated with the CEC function of the first HDMI port based on the CEC response signal corresponding to the first HDMI port (S720). For example, the processor 130 may identify whether there is a malfunction based on a CEC address received through the first HDMI port. Alternatively, the processor 130 may identify whether there is a malfunction based on a response to a specific type of CEC command. For example, if the CEC command is a command requesting a response for a device in which power is turned on, whether there is a malfunction may be identified based on the CEC response not being received or whether the response included in the CEC response signal corresponds to the CEC command.

According to an example, the processor 130 may turn off the CEC function corresponding to the first HDMI port when a malfunction is identified in the first HDMI port. For example, the processor 130 may not transmit a control command to the CEC line corresponding to the first HDMI port.

Then, the processor 130 may receive only the CEC response signal corresponding to the second HDMI port by maintaining the on state by not applying power to the second switching device, and turning off by not applying power to the remaining switching devices that include the first switching device (S730).

Then, the processor 130 may identify whether there is a malfunction associated with the CEC function of the second HDMI port based on the CEC response signal corresponding to the second HDMI port (S740).

However, if the source device is connected to only the first HDMI port and the second HDMI port and a malfunction is predicted in any one from among the first HDMI port and the second HDMI port only according to circumstance, whether there is a malfunction associated with the CEC function of the second HDMI port may not be identified if the malfunction associated with the CEC function of the first HDMI port had been identified in operation S720.

Figure 9:
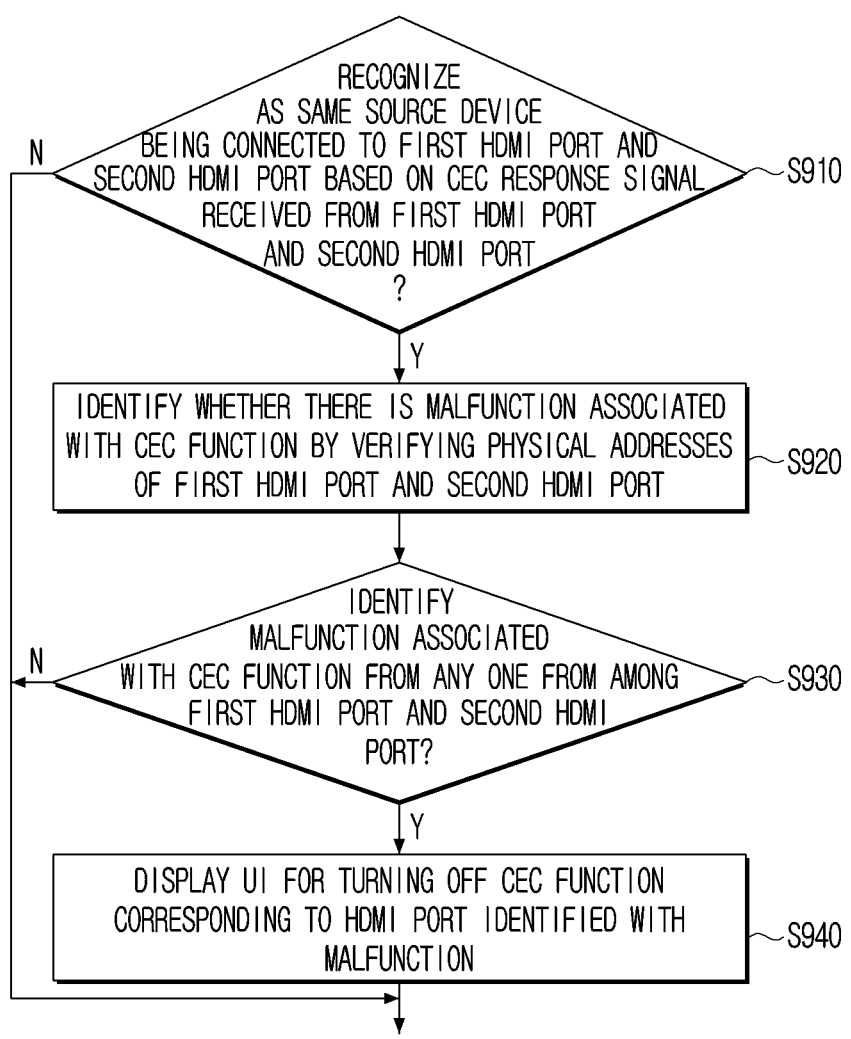
FIG. 9 is a flowchart illustrating a control method of an electronic apparatus according to one or more embodiments.

FIG. 9 is a flowchart illustrating a control method of an electronic apparatus according to one or more embodiments.

According to one or more embodiments shown in FIG. 9, the processor 130 may identify whether the same source device is connected to the first HDMI port and the second HDMI port based on the CEC response signal received from the first HDMI port and the second HDMI port (S910). The processor 130 according to an example may recognize as the same source device being connected to the first HDMI port and the second HDMI port if device identification information included in the CEC response signal received from the first HDMI port and the second HDMI port, respectively, is the same.

The processor 130 may identify, based on the same source device being recognized as connected to the first HDMI port and the second HDMI port (S910:Y), whether there is a malfunction associated with the CEC function by verifying physical addresses of the first HDMI port and the second HDMI port (S920). That is, the processor 130 may identify the physical addresses, that is the CEC addresses, of the first HDMI port and the second HDMI port to identify whether the same source device is actually connected to the first HDMI port and the second HDMI port, and whether the same source device is recognized as connected according to the CEC function malfunction.

The CEC address of the respective HDMI ports according to an example may be, in general, allocated to a pre-set value according to port identification information. For example, HDMI 1 may be allocated with a CEC address starting with 1 such as 1*, HDMI 2 with a CEC address starting with 2 such as 2*, and HDMI 3 with a CEC address starting with 3 such as 3***. However, if the CEC address of the corresponding source device is allocated with a value starting with 2 to the CEC response received from the source device connected through HDMI 1, the CEC address of the corresponding HDMI port and the CEC address of the connected source device may not be a match and accordingly, it may be verified that the connected source device is performing a CEC malfunction.

Then, the processor 130 may control, based on a malfunction associated with the CEC function being identified from any one from among the first HDMI port and the second HDMI port (S930:Y), the display 110 to display a UI for turning off the CEC function corresponding to the HDMI port identified with the malfunction.

FIG. 10, FIG. 11A to FIG. 11E, and FIG. 12 are diagrams illustrating a control method of an electronic apparatus according to one or more embodiments.

According to one or more embodiments, the processor 130 may identify, based on a connected device diagnosis function being executed, whether there is an error to a CEC address allocation of the source device connected to the respective HDMI ports. Then, the processor 130 may turn off, based on identifying that there is an error to the CEC address allocation of the source device connected to the at least one HDMI port from among the plurality of HDMI ports, the CEC function corresponding to the identified HDMI port or provide a UI for turning off the CEC function of the identified HDMI port.

Figure 10:
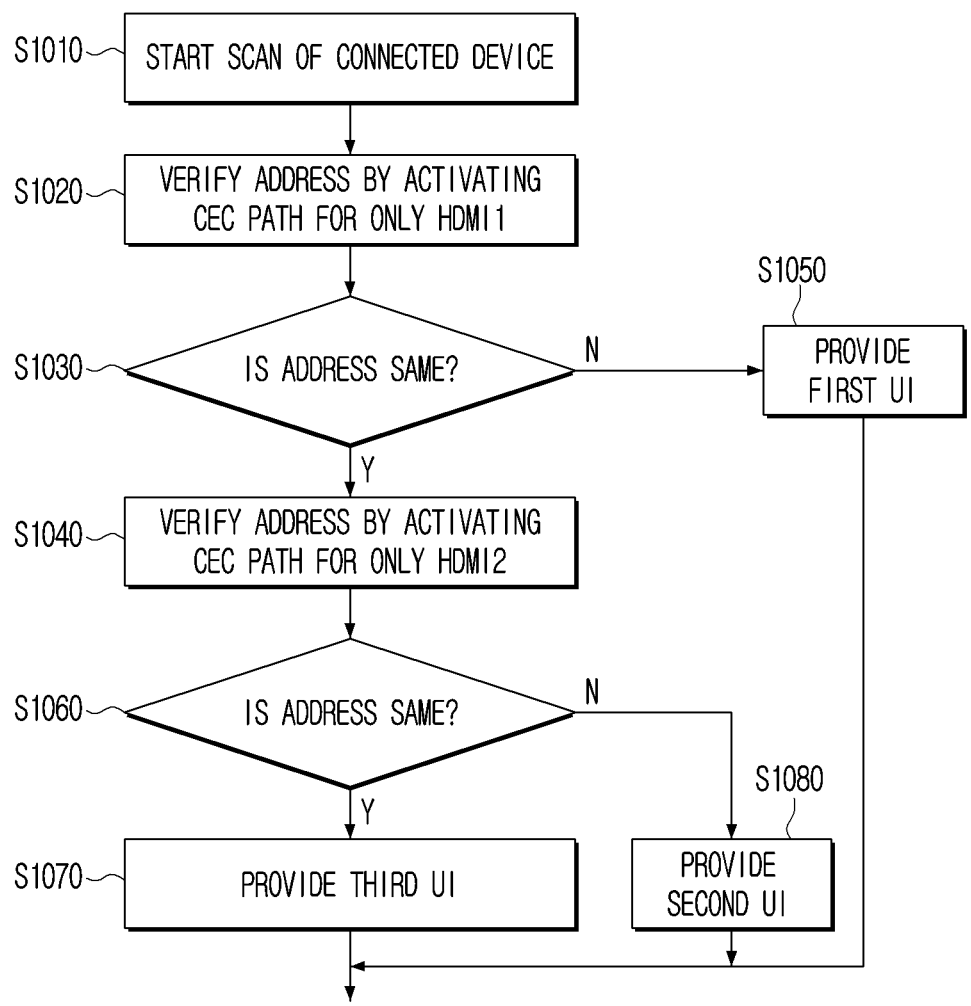
FIG. 10 is a diagram illustrating a control method of an electronic apparatus according to one or more embodiments.
Figure 11A:
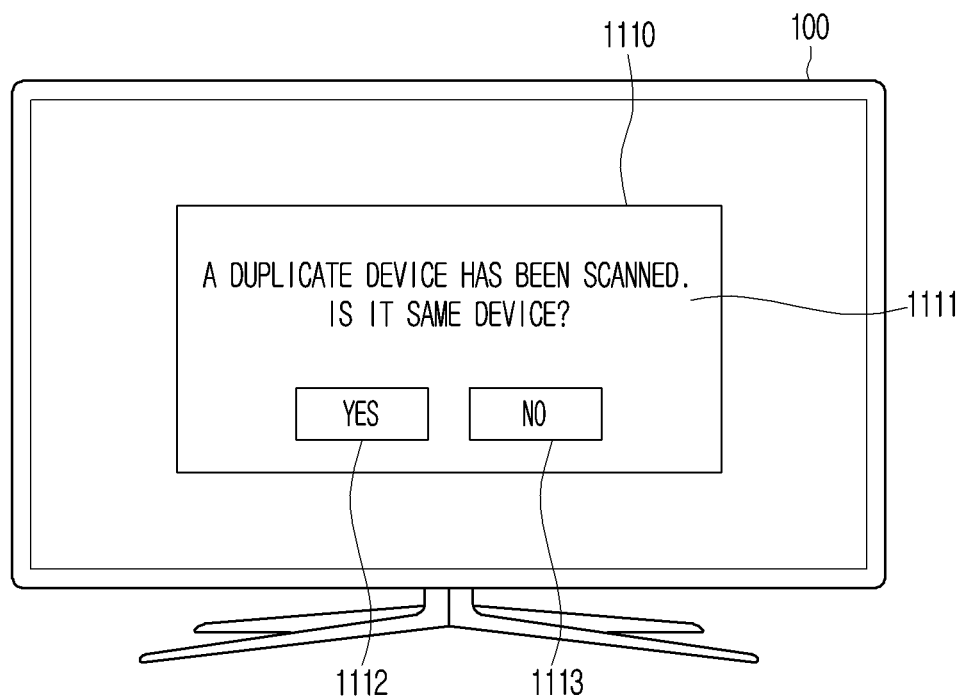
FIG. 11A is a diagram illustrating a control method of an electronic apparatus according to one or more embodiments.

According to one or more embodiments shown in FIG. 10, the processor 130 may start a diagnosis of the connected device (or connected device diagnosis) according to a pre-set event. For example, as shown in FIG. 8, when a user command is input through the UI 810 for receiving input of the user command for identifying a malfunction, the processor 130 may start the connected device diagnosis. However, if a duplicate device is recognized, a UI may be provided immediately as shown in FIG. 11A. For example, a provided UI 1110 may include a UI message 1111 such as "A duplicate device has been scanned. Is it same device?" and menu buttons 1112 and 1113 for selecting whether it is the same device. If a YES button 1112 is selected in a UI 1110 as shown in FIG. 11A, the processor 130 may begin the connected device diagnosis.

The processor 130 may verify, based on the connected device diagnosis being started (S1010), one from among the plurality of HDMI ports, for example, the CEC address by activating only HDMI 1 (S1020).

The processor 130 according to an example may identify, based on the CEC address of the corresponding source device being identified as allocated with a value starting with 1 based on the CEC response received from the source device connected through HDMI 1, that there is no problem to the CEC address allocation, that is, that the CEC address of the HDMI 1 and the CEC address of the source device are the same.

The processor 130 may verify, based on the CEC address being identified as the same in operation S1020 (S1030:Y), another one from among the plurality of HDMI ports, for example, the CEC address by activating only HDMI 2 (S1040).

Figure 11B:
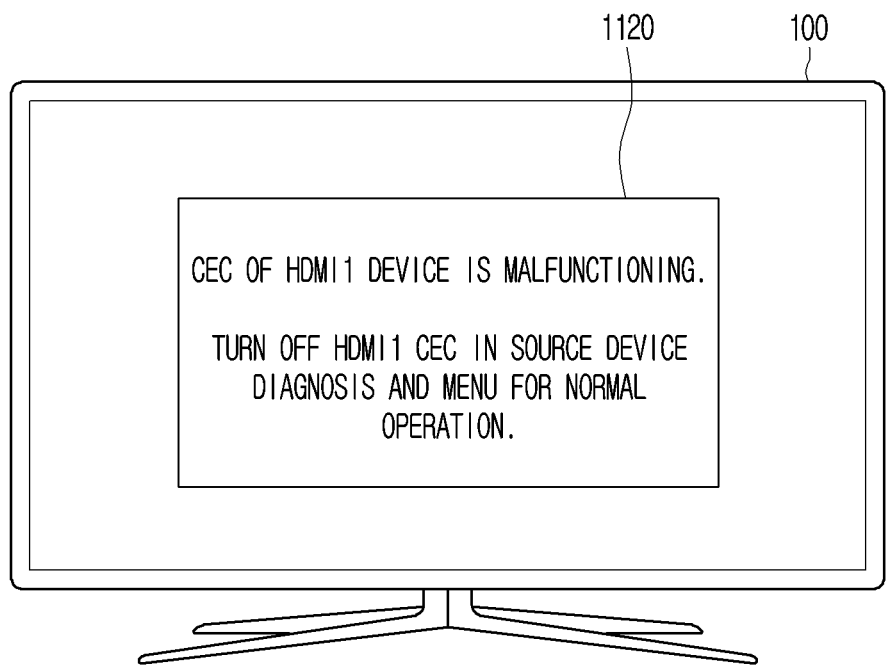
FIG. 11B is a diagram illustrating a control method of an electronic apparatus according to one or more embodiments.

Alternatively, the processor 130 may provide, based on the CEC address being identified as not the same in operation S1020 (S1030:N), a first UI (S1050). The first UI according to an example may be a UI 1120 including a guide message such as "A CEC of HDMI 1 device is malfunctioning. Turn off HDMI 1 CEC in source device diagnosis and menu for a normal operation." as shown in FIG. 11B.

Figure 11C:
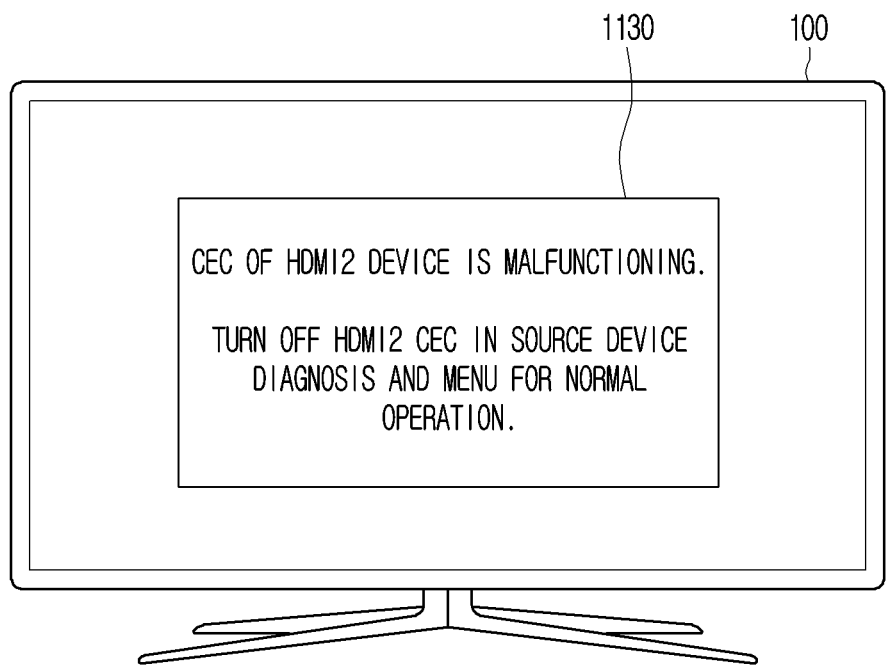
FIG. 11C is a diagram illustrating a control method of an electronic apparatus according one or more embodiments.

Meanwhile, the processor 130 may provide, based on the CEC address being identified as not the same in operation S1040 (S1060:N), a second UI (S1080). The second UI according to an example may be a UI 1130 including a guide message such as "A CEC of HDMI 2 device is malfunctioning. Turn off HDMI 2 CEC in source device diagnosis and menu for a normal operation." as shown in FIG. 11C.

Figure 11D:
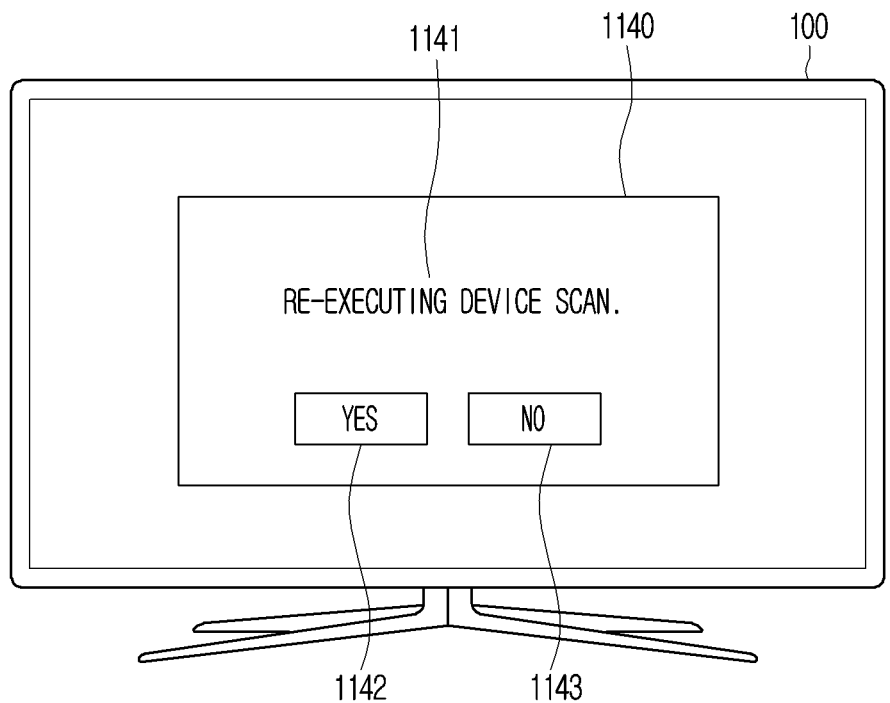
FIG. 11D is a diagram illustrating a control method of an electronic apparatus according to one or more embodiments.
Figure 11E:
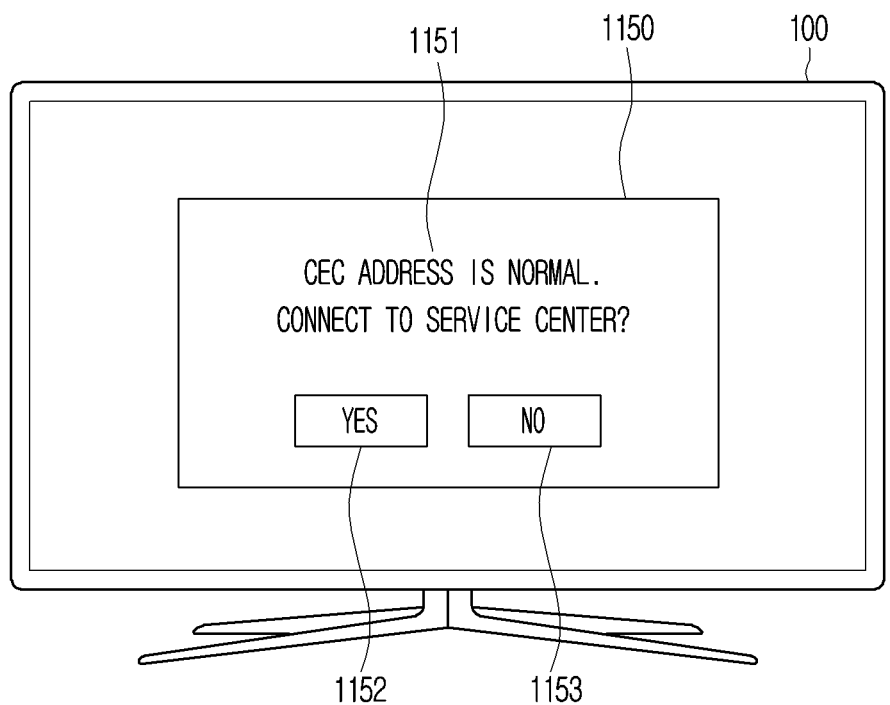
FIG. 11E is a diagram illustrating a control method of an electronic apparatus according to one or more embodiments.
Figure 12:
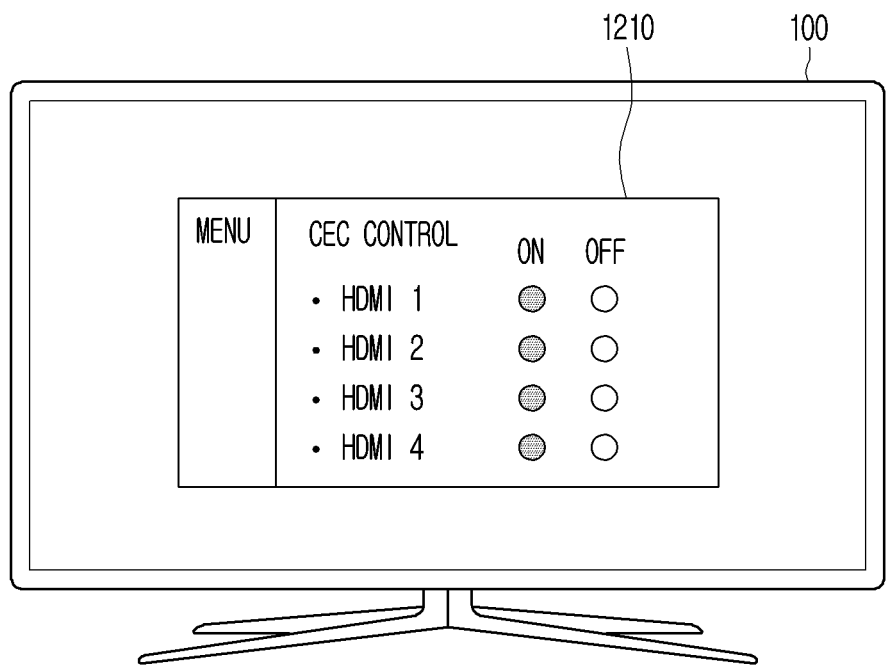
FIG. 12 is a diagram illustrating a control method of an electronic apparatus according to one or more embodiments.

The processor 130 may provide, based on the CEC address being identified as the same in operation S1040 (S1060:Y), a third UI (S1070). The third UI according to an example may be a UI 1140 including a guide message 1141 such as "Re-executing the device diagnosis." and menu buttons 1142 and 1143 for selection as shown in FIG. 11D. The third UI according to another example may be a UI 1150 including a guide message 1151 such as "CEC address is normal. Connect to service center?" and menu buttons 1152 and 1153 for selection as shown in FIG. 11E.

However, FIG. 10 describes an example of the connected source devices being two, and an operation verifying the CEC address for all connected source devices may be performed if the plurality of source device of at least three are connected.

Figure 13:
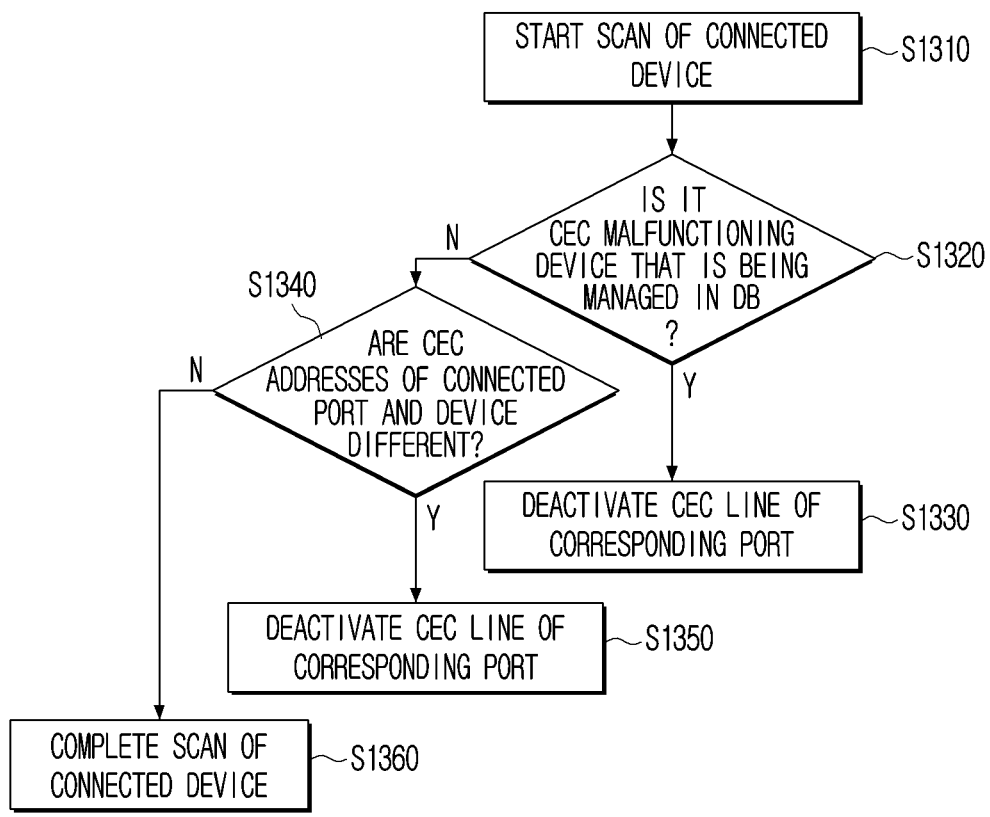
FIG. 13 is a diagram illustrating a control method of an electronic apparatus according to one or more embodiments.

FIG. 13 is a diagram illustrating a control method of an electronic apparatus according to one or more embodiments.

According to one or more embodiments, the processor 130 may identify, based on the connected device scanning function being executed, whether the source device connected to the respective HDMI ports is a pre-defined malfunctioning device. Then, the processor 130 may turn off, based on the source device connected to the at least one HDMI port from among the plurality of HDMI ports being identified as the pre-defined malfunctioning device, the CEC function corresponding to the identified HDMI port or provide a UI for turning off the CEC function of the identified HDMI port.

According to one or more embodiments shown in FIG. 13, the processor 130 may identify, based on scanning of the connected device being started (S1310), whether the source device connected through the HDMI port is a malfunctioning device that is being managed in a database (DB) (S1320). For example, identification information of devices in which malfunctions associated with the CEC function according to characteristics of the source device frequently occur may be managed through the DB (or look-up table). In this case, the processor 130 may identify whether the corresponding device is a malfunctioning device that is being managed in the DB based on whether identification information of the source device connected through the HDMI port is recorded. The processor 130 according to an example may obtain identification information of the corresponding device based on EDID information obtained from the source device.

The processor 130 may deactivate, based on the source device connected through the HDMI port being identified as the malfunctioning device that is being managed in the DB (S1320:Y), the CEC line of the corresponding HDMI port (S1330). For example, the processor 130 may deactivate the CEC line by controlling the switching device provided in the CEC line of the corresponding HDMI port. Accordingly, a malfunction associated with the CEC function of the corresponding source device may be prevented beforehand.

The processor 130 may compare, based on the source device connected through the HDMI port being identified as not the malfunctioning device that is being managed in the DB (S1320:N), the CEC address of the corresponding HDMI port and the CEC address of the connected source device (S1340). The CEC address of the respective HDMI ports according to an example may be, in general, allocated to the pre-set value according to the port identification information. For example, HDMI 1 may be allocated with a CEC address starting with 1 such as 1*, HDMI 2 with a CEC address starting with 2 such as 2*, and HDMI 3 with a CEC address starting with 3 such as 3***. However, if the CEC address of the corresponding source device is allocated with a value starting with 2 to the response received from the source device connected through HDMI 1, the CEC address of the corresponding HDMI port and the CEC address of the connected source device may not be a match and accordingly, it may be verified that the connected source device is performing a CEC malfunction.

Accordingly, the processor 130 may deactivate, based on the CEC address of the corresponding HDMI port and the CEC address of the connected source device being different (S1340:Y), the CEC line of the corresponding HDMI port (S1350). For example, the processor 130 may deactivate the CEC line by controlling the switching device provided in the CEC line of the corresponding HDMI port to the off state. Accordingly, a malfunction associated with the CEC function of the corresponding source device may be prevented beforehand.

In addition, the processor 130 may end, based on the CEC address of the corresponding HDMI port and the CEC address of the connected source device being the same (S1340:N), the scanning of the connected device determining as there is no problem with the CEC function of the source device connected to the corresponding HDMI port (S1360).

However, FIG. 13 only describes of the scanning operation for one connected source device, and the diagnosis function of the connected device may be ended after the diagnosis operation as in FIG. 13 is performed for all connected source devices when the plurality of source device are connected.

Figure 14:
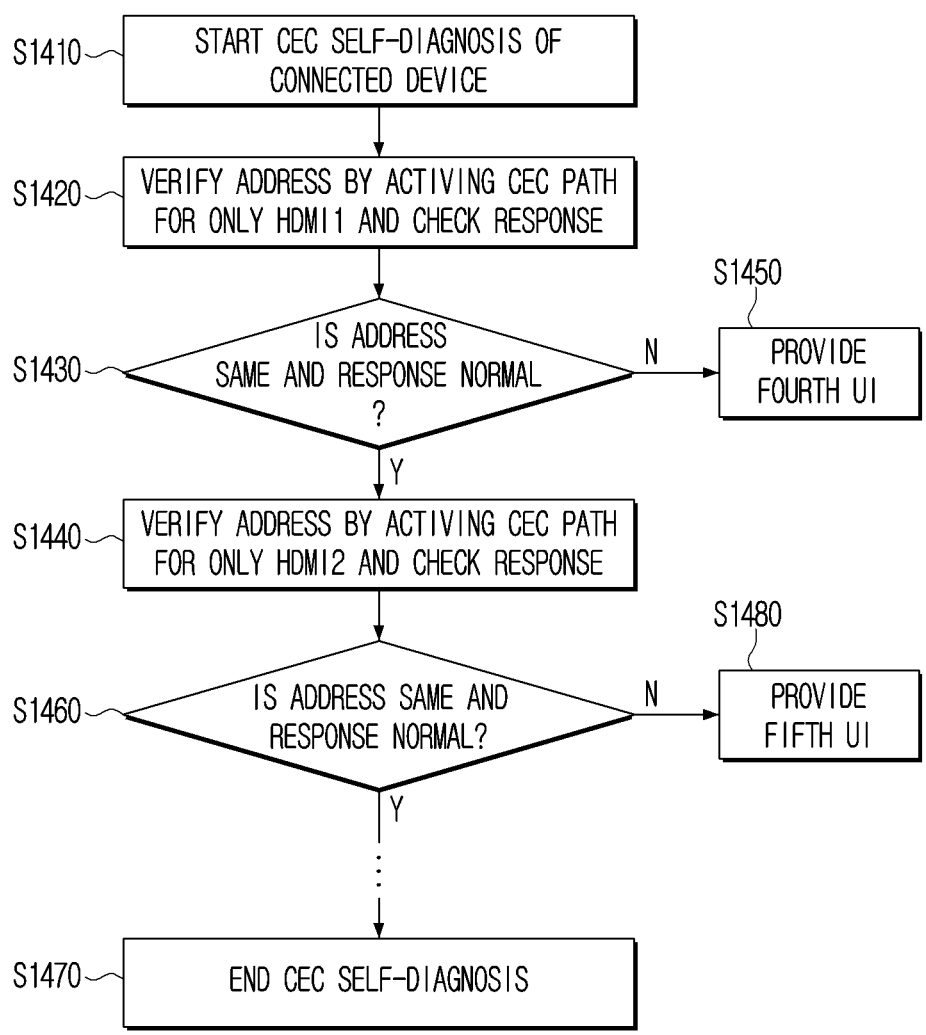
FIG. 14 is a diagram illustrating a control method of an electronic apparatus according to one or more embodiments.

FIG. 14 is a diagram illustrating a control method of an electronic apparatus according to one or more embodiments.

According to one or more embodiments, the processor 130 may transmit, based on a self-diagnosis function being executed, a command of a specific type through the CEC line. In this case, the processor 130 may sequentially control power being applied to the switching devices provided at the respective HDMI ports and identify at least one HDMI port in which a malfunction associated with the CEC function is generated from among the plurality of HDMI ports based on the CEC response signal received through the respective HDMI ports. Then, the processor 130 may turn off the CEC function of the identified at least one HDMI port.

According to one or more embodiments shown in FIG. 14, the processor 130 may verify, based on a CEC self-diagnosis function of the connected device being executed (S1410), one from among the plurality of HDMI ports, for example, the CEC address by activating only HDMI 1 and check the CEC response (S1420). According to an example, if the CEC address of the corresponding source device is allocated with a value staring with 1 to the response received from the source device connected through HDMI 1, it may be identified as there being no problem to the CEC address allocation, that is, the CEC address of HDMI 1 and the CEC address of the source device may be identified as the same. In addition, whether a normal response for a command transmitted through HDMI 1 is received may be checked. For example, whether a response to the command transmitted through HDMI 1 is received, and whether a response corresponding to a request command is received may be identified.

The processor 130 may verify, based on the CEC address being the same and the CEC response being identified as normal in operation S1420 (S1430:Y), another one from among the plurality of HDMI ports, for example, the CEC address by activating only HDMI 2 and checking the CEC response (S1440).

Alternatively, the processor 130 may provide, based on the CEC address not being the same, or the CEC response being identified as not normal in operation S1420 (S1430:N), a fourth UI (S1450). The fourth UI according to an example may be a UI 1120 including a guide message such as "A CEC of HDMI 1 device is malfunctioning. Turn off HDMI 1 CEC in source device diagnosis and menu for a normal operation." as shown in FIG. 11B according to an example.

The second UI according to an example may be a UI 1130 including a guide message such as "A CEC of HDMI 2 device is malfunctioning. Turn off HDMI 2 CEC in source device diagnosis and menu for a normal operation." as shown in FIG. 11C.

Meanwhile, if the CEC address is the same and the CEC response is identified as normal in operation S1440 (S1460:Y), the CEC self-diagnosis may be ended (S1470).

Alternatively, the processor 130 may provide, based on the CEC address not being the same, or the CEC response being identified as not normal in operation S1440 (S1460:N), a fifth UI (S1480). The fifth UI according to an example may be a UI 1130 including a guide message such as "A CEC of HDMI 2 device is malfunctioning. Turn off HDMI 2 CEC in source device diagnosis and menu for a normal operation." as shown in FIG. 11C.

However, FIG. 14 describes of performing the self-diagnosis when the connected source device is two, and the self-diagnosis function may be ended after the self-diagnosis operation is performed as in FIG. 14 for all connected source devices if the plurality of source device of at least three are connected.

Through the CEC self-diagnosis function as described above, the CEC malfunction being a source device malfunction may be made aware to the user by verifying the physical address (or a logic address) of the respective HDMI ports. In this case, unnecessary consumer calls generated due to it being recognized as the sink device of the related art, that is, a TV malfunction may be reduced.

According to the various embodiments described above, if the CEC function of the HDMI port malfunctions, the CEC function may be controllable from the sink device such as the TV. In this case, user convenience may be improved as a CEC function menu is operable using a TV remote controller and as control of the TV remote controller can be increased. In addition, user convenience may be improved because only the HDMI port with the CEC function malfunctioning can be separately controlled from among the plurality of HDMI ports. In addition, a malfunction with another source device may be prevented beforehand by activating the CEC line for only the device selected as a source.

Meanwhile, methods according to the various embodiments of the disclosure described above may be implemented in an application form installable in an electronic apparatus of the related art. Alternatively, methods according to the various embodiments of the disclosure described above may be performed using a deep learning-based artificial neural network (or deep artificial neural network), that is, a learning network model. A generation of an interpolated frame according to an example may be performed through a trained neural network model.

In addition, the methods according to the various embodiments of the disclosure described above may be implemented with only a software upgrade, or a hardware upgrade for the electronic apparatus of the related art.

In addition, the various embodiments of the disclosure described above may be performed through an embedded server provided in the electronic apparatus, or an external server of the electronic apparatus.

Meanwhile, according to one or more embodiments of the disclosure, the various embodiments described above may be implemented with software including instructions stored in a machine-readable storage media (e.g., computer). The machine may call an instruction stored in the storage medium, and as a device operable according to the called instruction, may include an electronic apparatus (e.g., electronic apparatus (A)) according to the above-mentioned embodiments. Based on a command being executed by the processor, the processor may directly or using other elements under the control of the processor perform a function corresponding to the command. The command may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to one or more embodiments of the disclosure, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be stored at least temporarily in the storage medium such as a server of a manufacturer, a server of an application store, or a memory of a relay server, or temporarily generated.

In addition, the respective elements (e.g., a module or a program) according to various embodiments may be formed as a single entity or a plurality of entities, and some sub-elements of the above-mentioned sub-elements may be omitted, or other sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with various embodiments, may be executed sequentially, in a parallel, repetitively, or in a heuristic manner, or at least some operations may be executed in a different order, omitted or a different operation may be added.

While the disclosure has been particularly shown and described with reference to embodiments thereof, it will be understood that various changes in form and details may be made therein without departing from the spirit and scope of the following claims.

What is claimed is:

1. An electronic apparatus comprising:
a display;
an input interface comprising a first high-speed multimedia interface (HDMI) port configured to connect to a first source device, and a second HDMI port configured to connect to a second source device; and
at least one processor operatively connected with the display and the input interface,
wherein a first switching device is provided in a first consumer electronic control (CEC) line corresponding to the first HDMI port, and a second switching device is provided in a second CEC line corresponding to the second HDMI port, and
wherein the at least one processor is configured to:
control, based on a malfunction of a CEC function being identified from the first source device or the second source device, the display to display a user interface (UI) for turning off the CEC function, and
turn off the CEC function by separately controlling at least one of the first switching device or the second switching device based on a user command received through the UI, while maintaining HDMI connections to the first source device and the second source device.

2. The electronic apparatus of claim 1, wherein a malfunction HDMI port from among the first HDMI port and the second HDMI port is identified with the malfunction of the CEC function, and
the UI comprises at least one of identification information of the malfunction HDMI port, information guiding to turn off of the CEC function of the malfunction HDMI port, or a menu for turning off the CEC function corresponding to the malfunction HDMI port.

3. The electronic apparatus of claim 1, wherein each of the first switching device and the second switching device is configured to operate to be turned on or turned off according to whether power is applied,
the at least one processor comprises a general-purpose input/output (GPIO), a first pin of the GPIO is configured to be connected with the first switching device and a second pin of the GPIO is configured to be connected with the second switching device, and
the at least one processor is further configured to turn on or turn off at least one of the first switching device or the second switching device by controlling whether the power is to be applied to at least one of the first switching device or the second switching device using the GPIO.

4. The electronic apparatus of claim 1, wherein each of the first switching device and the second switching device is configured to operate to be turned on or turned off according to whether power is applied, and
the at least one processor is further configured to:
identify at least one malfunction HDMI port with the malfunction of the CEC function generated from among the first HDMI port and the second HDMI port by sequentially controlling the power applied to the first switching device and the second switching device according to the user command, and
control the display to display the UI for turning off the CEC function corresponding to the at least one malfunction HDMI port.

5. The electronic apparatus of claim 4, wherein the at least one processor is further configured to:
receive only a first CEC response signal corresponding to the first HDMI port by not applying the power to the first switching device according to the user command and maintaining a close state and applying the power to the second switching device and changing to an open state,
identify whether the malfunction of the CEC function is generated from the first HDMI port based on the first CEC response signal,
receive only a second CEC response signal corresponding to the second HDMI port by not applying the power to the second switching device and maintaining the close state and applying the power to the first switching device and changing to the open state, and
identify whether the malfunction of the CEC function is generated from the second HDMI port based on the second CEC response signal.

6. The electronic apparatus of claim 1, wherein the at least one processor is further configured to:
identify whether the malfunction of the CEC function is generated from the first HDMI port based on a first CEC address comprised in a first CEC response signal corresponding to the first HDMI port, whether the first CEC response signal is received, or whether the first CEC response signal is normal, and
identify whether the malfunction of the CEC function is generated from the second HDMI port based on a second CEC address comprised in a second CEC response signal corresponding to the second HDMI port, whether the second CEC response signal is received, or whether the second CEC response signal is normal.

7. The electronic apparatus of claim 1, wherein the at least one processor is further configured to:

identify, based on a same source device being recognized as connected to the first HDMI port and the second HDMI port based on CEC response signals received from the first HDMI port and the second HDMI port, whether the malfunction of the CEC function is generated by verifying CEC addresses of the first HDMI port and the second HDMI port, and
control, based on the malfunction of the CEC function being identified from any one of the first HDMI port and the second HDMI port, the display to display the UI for turning off the CEC function corresponding to a malfunction HDMI port identified with the malfunction.

8. The electronic apparatus of claim 1, wherein the at least one processor is further configured to:
transmit, based on a self-diagnosis function being executed, a command of a specific type through the first CEC line and the second CEC line,
identify at least one malfunction HDMI port with the malfunction of the CEC function generated from among the first HDMI port and the second HDMI port based on a first CEC response signal received through the first HDMI port and a second CEC response signal received through the second HDMI port by sequentially controlling power applied to the first switching device and the second switching device, and
control the display to turn off the CEC function of the at least one malfunction HDMI port or display the UI for turning off the CEC function of the at least one malfunction HDMI port.

9. The electronic apparatus of claim 1, wherein the at least one processor is further configured to:
identify, based on a connected device diagnosis function being executed, whether a source device connected to one of the first HDMI port and the second HDMI port is a pre-defined malfunctioning device, and
control, based on the source device connected to at least one malfunction HDMI port from among the first HDMI port and the second HDMI port being identified as the pre-defined malfunctioning device, the display to turn off the CEC function corresponding to the at least one malfunction HDMI port or display the UI for turning off the CEC function of the at least one malfunction HDMI port.

10. A method of controlling an electronic apparatus comprising a first high-speed multimedia interface (HDMI) port configured to connect to a first source device and a second HDMI port configured to connect to a second source device, in which a first switching device is provided in a first consumer electronic control (CEC) line corresponding to the first HDMI port, and a second switching device is provided in a second CEC line corresponding to the second HDMI port, the method comprising:
displaying, based on a malfunction of a CEC function being identified from at least one of the first source device or the second source device, a user interface (UI) for turning off the CEC function; and
turning off the CEC function by separately controlling at least one of the first switching device or the second switching device based on a user command received through the UI, while maintaining HDMI connections to the first source device and the second source device.

11. The method of claim 10, further comprising:
identifying a malfunction HDMI port from among the first HDMI port and the second HDMI port with the malfunction of the CEC function, wherein the UI comprises at least one of identification information of the malfunction HDMI port, information guiding to turn off of the CEC function of the malfunction HDMI port, or a menu for turning off the CEC function corresponding to the malfunction HDMI port.

12. The method of claim 10, wherein each of the first switching device and the second switching device is configured to operate to be turned on or turned off according to whether power is applied,
the electronic apparatus comprises at least one processor configured to control the electronic apparatus, the at least one processor comprises a general-purpose input/output (GPIO), a first pin of the GPIO is configured to be connected with the first switching device and a second pin of the GPIO is configured to be connected with the second switching device, and
the turning off the CEC function comprises turning on or turning off at least one of the first switching device or the second switching device by controlling whether the power is to be applied to at least one of the first switching device or the second switching device using the GPIO.

13. The method of claim 10, wherein each of the first switching device and the second switching device is configured to operate to be turned on or turned off according to whether power is applied, and
the displaying the UI comprises:
identifying at least one malfunction HDMI port with the malfunction of the CEC function generated from among the first HDMI port and the second HDMI port by sequentially controlling the power applied to the first switching device and the second switching device according to the user command; and
displaying the UI for turning off the CEC function corresponding to the at least one malfunction HDMI port.

14. The method of claim 13, wherein the displaying the UI further comprises:
receiving only a first CEC response signal corresponding to the first HDMI port by not applying the power to the first switching device according to the user command and maintaining a close state and applying the power to the second switching device and changing to an open state;
identifying whether the malfunction of the CEC function is generated from the first HDMI port based on the first CEC response signal;
receiving only a second CEC response signal corresponding to the second HDMI port by not applying the power to the second switching device and maintaining the close state and applying the power to remaining switching devices comprising the first switching device and changing to the open state; and
identifying whether the malfunction of the CEC function is generated from the second HDMI port based on the second CEC response signal.

15. A non-transitory computer readable storage medium storing computer instructions that are executed by at least one processor of an electronic apparatus to perform a method, the electronic apparatus comprising a first high-speed multimedia interface (HDMI) port configured to connect to a first source device and a second HDMI port configured to connect to a second source device, a first switching device provided in a first consumer electronic control (CEC) line corresponding to the first HDMI port, and a second switching device provided in a second CEC line corresponding to the second HDMI port, the method comprising:
displaying, based on a malfunction of a CEC function being identified from at least one of the first source device and the second source device, a user interface (UI) for turning off the CEC function; and
turning off the CEC function by separately controlling at least one of the first switching device or the second switching device based on a user command received through the UI, while maintaining HDMI connections to the first source device and the second source device.

16. The non-transitory computer readable storage medium of claim 15, wherein the method further comprises:
identifying a malfunction HDMI port from among the first HDMI port and the second HDMI port with the malfunction of the CEC function, and
wherein the UI comprises at least one of identification information of the malfunction HDMI port, information guiding to turn off of the CEC function of the malfunction HDMI port, or a menu for turning off the CEC function corresponding to the malfunction HDMI port.

17. The non-transitory computer readable storage medium of claim 15, wherein each of the first switching device and the second switching device is configured to operate to be turned on or turned off according to whether power is applied,
the at least one processor comprises a general-purpose input/output (GPIO), a first pin of the GPIO is configured to be connected with the first switching device and a second pin of the GPIO is configured to be connected with the second switching device, and
the turning off the CEC function comprises turning on or turning off at least one of the first switching device or the second switching device by controlling whether the power is to be applied to at least one of the first switching device or the second switching device using the GPIO.

18. The non-transitory computer readable storage medium of claim 15, wherein each of the first switching device and the second switching device is configured to operate to be turned on or turned off according to whether power is applied, and
the displaying the UI comprises:
identifying at least one malfunction HDMI port with the malfunction of the CEC function generated from among the first HDMI port and the second HDMI port by sequentially controlling the power applied to the first switching device and the second switching device according to the user command; and
displaying the UI for turning off the CEC function corresponding to the at least one malfunction HDMI port.

19. The non-transitory computer readable storage medium of claim 18, wherein the displaying the UI further comprises:
receiving only a first CEC response signal corresponding to the first HDMI port by not applying the power to the first switching device according to the user command and maintaining a close state and applying the power to the second switching device and changing to an open state;
identifying whether the malfunction of the CEC function is generated from the first HDMI port based on the first CEC response signal;

receiving only a second CEC response signal corresponding to the second HDMI port by not applying the power to the second switching device and maintaining the close state and applying the power to remaining switching devices comprising the first switching device and changing to the open state; and identifying whether the malfunction of the CEC function is generated from the second HDMI port based on the second CEC response signal.

\* \* \* \* \*